United States Patent [19]
Tabeta

[11] Patent Number: 6,144,693
[45] Date of Patent: Nov. 7, 2000

[54] RADIO COMMUNICATION SYSTEM USING A FREQUENCY HOPPING METHOD AND A METHOD FOR CONTROLLING THE SYSTEM

[75] Inventor: Hideya Tabeta, Kawasaki, Japan

[73] Assignee: Canon Kabushiki Kaisha, Tokyo, Japan

[21] Appl. No.: 08/825,125

[22] Filed: Mar. 27, 1997

[30] Foreign Application Priority Data

Apr. 11, 1996 [JP] Japan .................................. 8-089542

[51] Int. Cl.[7] .............................. A61F 2/06; H04L 27/30
[52] U.S. Cl. ......................................... 375/132; 370/329
[58] Field of Search .................................. 375/200, 202, 375/130, 132, 134, 135, 136, 137; 370/310, 319, 324, 329, 331, 465, 467

[56] References Cited

U.S. PATENT DOCUMENTS

| | | | |
|---|---|---|---|
| 5,339,331 | 8/1994 | Beauchamp et al. | 375/200 |
| 5,528,622 | 6/1996 | Cadd et al. | 375/202 |
| 5,537,434 | 7/1996 | Persson et al. | 375/202 |
| 5,701,584 | 12/1997 | Dupuy | 455/33.1 |
| 5,870,391 | 2/1999 | Nago | 370/330 |

*Primary Examiner*—Chi H. Pham
*Assistant Examiner*—Bryan Webster
*Attorney, Agent, or Firm*—Fitzpatrick, Cella, Harper & Scinto

[57] ABSTRACT

In a radio communication system with a radio control apparatus in radio communication with radio communication apparatus, a frequency hopping method is used in which the frequencies of a hopping pattern are determined by the radio control apparatus. When the frequencies of the hopping pattern are redetermined, the radio communication apparatus is intstructed to end intermittent reception and is notified of the reconfigured hopping pattern. In response to the instruction, the radio communication apparatus ends intermittent reception and shifts to a state of receiving the notification of the hopping pattern from the radio control apparatus. The frequency for performing intermittent reception is based on the relationship between the period of the notified hopping pattern and the time interval of intermittent reception. These arrangements result in reduction of the time required until the radio communication apparatus can perform frequency hopping communication and electric power consumption of the radio communication apparatuses.

42 Claims, 17 Drawing Sheets

FIG.6

SYSTEM CONTROL CHANNEL (CNT)

| CS | PR | SYN | ID | BF | WA | NF | Rev | CRC | GT |
|----|----|-----|----|----|----|----|-----|-----|-----|
| 8  | 56 | 32  | 64 | 8  | 8  | 8  | 8   | 16  | 33 |

LOGIC CONTROL CHANNEL (LCCH)

| CS0 | CS1 | CS2 | PR | UW | DA1 | DA2 | Data | CRC | CF |
|-----|-----|-----|----|----|----|-----|------|-----|-----|
| 8   | 8   | 8   | 56 | 24 | 8   | 8   | 120  | 16  | 80 |

DATA CHANNEL

| CF | CS0 | CS1 | CS2 | PR | UW | DA | Data | CRC | GT |
|----|-----|-----|-----|----|----|----|------|-----|-----|
| 80 | 8   | 8   | 8   | 56 | 24 | 8  | 4400 | 16  | 68 |

VOICE CHANNEL

| CS | PR | UW | T/R | CRC | GT |
|----|----|----|-----|-----|-----|
| 80 | 56 | 24 | 320 | 16  | 32 |

END

| CF |
|----|
| 85 |

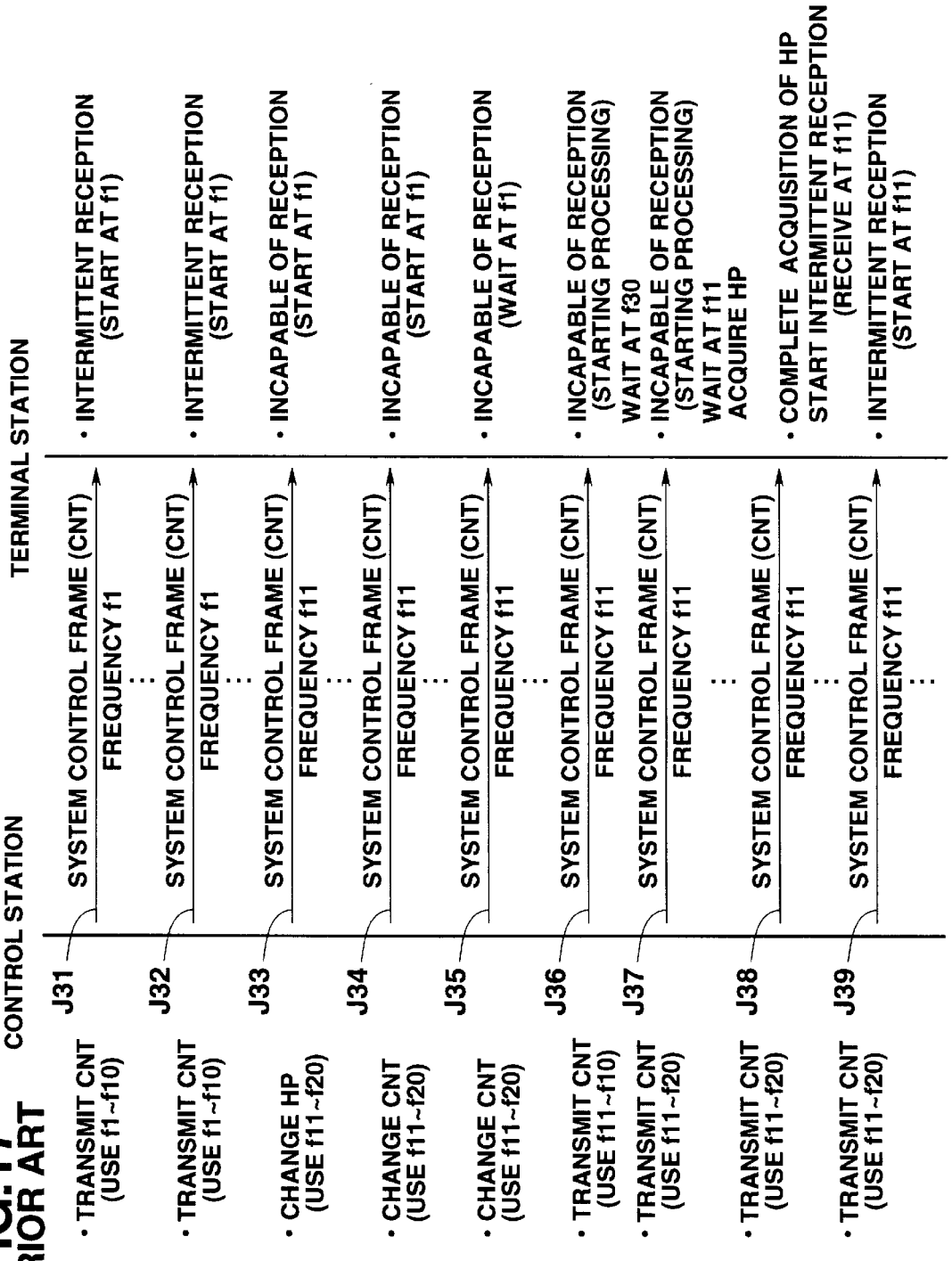

RADIO COMMUNICATION SYSTEM USING A FREQUENCY HOPPING METHOD AND A METHOD FOR CONTROLLING THE SYSTEM

BACKGROUND OF THE INVENTION

1. Field of the Invention

This invention relates to a radio communication system and a radio communication apparatus using a frequency hopping method.

2. Description of the Related Art

Conventionally, a radio communication apparatus and a control station for controlling the radio communication apparatus perform communication using a predetermined frequency dedicated to control and another predetermined frequency dedicated to communication.

When the control station and the radio communication apparatus do not perform communication, the control station intermittently transmits control information at the frequency dedicated to control at a predetermined time interval, and the radio communication apparatus intermittently receives the control information at a predetermined time interval.

Before starting the intermittent reception, the radio communication apparatus performs a receiving operation until the control information can be received at one of the frequencies dedicated to control. When the radio communication apparatus becomes capable of receiving the control information, it reads the frequency used by the control station for the intermittent transmission and the interval of the intermittent transmission, and then starts the intermittent reception using the obtained information.

The interval of the intermittent reception is set to be shorter as the radio communication apparatus is more frequently used, because of the following reason.

That is, since a call-receiving operation and the like frequently occur in a radio communication apparatus which is frequently used, the operability of the apparatus is improved if the control frequency can be frequently received. On the other hand, since a call-receiving operation and the like seldom occur in a radio communication apparatus which is less frequently used, priority is given to a reduction in the amount of power consumption of the battery rather than improvement in operability.

When the radio communication apparatus becomes incapable of receiving the control information during the intermittent reception, the apparatus performs the same operation as when starting the intermittent reception in order to resume the intermittent reception.

Since the frequency for control used by the radio communication apparatus is predetermined, a time period until the control information can be received when starting the intermittent reception is very small.

A frequency hopping method is used as one of radio communication methods.

When performing communication using the frequency hopping method, the control station checks the states of all frequencies which can be used in the system, and provides a basic hopping pattern to be used in the system by selecting frequencies having an excellent radio-wave environment.

The control station then transmits a synchronizing frame and control information so that a terminal station can obtain synchronism at every frequency of the basic hopping pattern. When the terminal station has received the synchronizing frame at one of the frequencies of the basic hopping pattern, it performs intermittent reception by performing a receiving operation every time the synchronizing frame is transmitted at that frequency. Thus, the terminal station is synchronized with the control station, and performs control in accordance with the control information.

That is, a receiving operation is performed at every cycle of the hopping pattern.

When the control station has detected that the environment of the frequency used in the basic hopping pattern is degraded, it changes the frequency to be used in the basic hopping pattern to an unused frequency after determining that the environment of that frequency is excellent.

The operation of the intermittent reception and the processing of changing the hopping pattern in the conventional frequency hopping method will now be described with reference to FIGS. 15 through 17.

FIG. 15 is a flowchart illustrating the operation of a conventional control station.

In FIG. 15, processing of measuring the radio-wave environment for all frequencies capable of being used in the system is performed in step J11. In step J12, a basic hopping pattern (HP) is determined by selecting frequencies having excellent radio-wave environment. In J13, ordinary processing of transmitting a synchronizing frame for all frequencies of the basic hopping pattern is performed while switching the frequency. During this processing, in J14, the radio-wave environment of the frequencies used in the basic hopping pattern is measured. If a need for a change in the hopping pattern is determined in step J15 as the result of the measurement, the process proceeds to step J16, where the hopping pattern to be used is changed irrespective of the operation of the terminal station.

FIG. 16 is a flowchart illustrating the operation of the terminal station.

During intermittent reception at a frequency by the terminal station, in step J22, a predetermined time period (corresponding to one cycle of the hopping pattern) is counted in step J22 in order to prepare for the reception of a synchronzing signal from the control station at every predetermined time interval. If the lapse of the predetermined time period has been detected in step J23, the process proceeds to step J24, where the state of the receiving operation is controlled in order to confirm synchronism. If proper synchronism is confirmed in step J25, the process returns to step J21 and the intermittent reception is continued.

If lack of synchronism is confirmed in step J25, the process proceeds to step J26, where it is determined if the number of times of the lack of synchronism reaches a predetermined number. If the result of the determination in step J26 is "no", the process returns to step J21 and the intermittent reception is continued. If the result of the determination in step J26 is affirmative, the process proceeds to step J27, where waiting is performed at a frequency for intermittent reception. Then, it is determined if synchronism can be obtained by receiving again a synchronizing frame during a predetemined time period (steps J28 and J29).

When synchronism cannot be obtained after the predetermined time period, the process proceeds to step J30, where the power supply is again started to resume the intermittent reception.

FIG. 17 illustrates the operation sequence of the conventional system.

In steps J31 and J32, while the control station transmits a synchronizing frame (CNT) to the terminal station using hopping frequencies f1–f10, the terminal station performs intermittent reception at the frequency f1 based on the synchronizing frame. In FIG. 17, a broken line indicates that the synchronizing frame is transmitted during the time period of f1–f10. In steps J33 and J34, when the control station uses f1–f20 by changing the hopping pattern, the terminal station which performs intermittent reception at the frequency f1 cannot receive the synchronizing frame transmitted at the frequency f11.

When the synchronizing frame cannot be received a predetermined number of times (twice in the present example), the intermittent reception is interrupted, and waiting is performed at the frequency f1 used for the intermittent reception. That is, when the synchronizing frame cannot be received because the timing for performing intermittent reception shifts, the synchronizing frame can be received by interrupting the intermittent reception and waiting at the frequency used for the intermittent reception.

When the synchronizing frame cannot be received even by waiting at the frequency used for the intermittent reception, starting processing is performed in step J36, and the processing of acquiring the hopping pattern as when the power supply is turned on is performed. That is, waiting is performed at an arbitrary frequency f30. If the synchronizing frame cannot be received even in this state, the frequency to be received is changed in step J37, and waiting is performed at the frequency f11. When the synchronizing frame from the control station can be received in step J37, the terminal station acquires the hopping pattern. When the acquisition of the hopping pattern has been completed in step J38, the terminal station determines the frequency f11 for performing intermittent reception, and intermittent reception is performed in step J39.

In the above-described conventional approach, however, when the terminal which performs communication using the frequency hopping method performs intermittent reception, since the intermittent reception is performed at an arbitrary frequency at every period of the hopping pattern, even a terminal which is frequently used cannot perform intermittent reception at an interval shorter than one period of the hopping pattern.

On the other hand, even a terminal which is less frequently used cannot lengthen the interval of intermittent reception.

When changing the basic hopping pattern in the control station in the above-described conventional approach, the following problems are present.

In step J24 shown in FIG. 16, the terminal station performs starting processing at every predetermined time interval during the intermittent reception and receives the synchronizing signal from the control station at an arbitrary frequency. However, if the control station changes frequencies used in the basic hopping pattern for some reason, the terminal station cannot receive the synchronizing signal from the control station during the intermittent reception. In such a case, the terminal station continues the intermittent reception for a while. If the synchronizing signal cannot be received even in this state, the terminal station performs starting processing and receives the synchronizing signal. Hence, a considerable amount of time is required until a state in which the terminal station can perform communication is reached after changing the hopping pattern.

Furthermore, in an inferior frequency environment where the hopping pattern must be frequently changed, the terminal station frequently performs starting processing, thereby rapidly consuming the battery.

In addition, when changing all frequencies used in the basic hopping pattern, all terminal stations which perform intermittent reception must perform starting processing. As a result, there is the possibility that all the terminals which perform intermittent reception cannot be used, thereby degrading the reliability of the system.

SUMMARY OF THE INVENTION

It is an object of the present invention to improve the operability of a terminal.

It is a further object of the present invention to decrease the rate of occurrence of the state of inoperability of a terminal.

It is a still further object of the present invention to improve the reliability of the entire system.

It is yet another object of the present invention to prevent the occurrence of simultaneous inoperability of all terminals within a system.

It is still a further object of the present invention to minimize electric power consumption of a terminal.

It is still another object of the present invention to notify, when a hopping pattern is changed at a control station, a terminal performing intermittent reception if the entire hopping pattern is to be changed or if an arbitrary frequency in the hopping pattern is to be changed.

It is still another object of the present invention to prevent restarting of a terminal even if the frequency for intermittent reception is changed while the terminal performs the intermittent reception.

It is still another object of the present invention to arrange a system such that, when a terminal receives a notification of a change in a hopping pattern from a control station, it terminates intermittent reception and shifts to a state of acquiring a new hopping pattern.

It is still another object of the present invention to arrange a system such that a terminal can efficiently perform intermittent reception.

It is still another object of the present invention to simplify design relating to intermittent reception of a terminal.

It is still another object of the present invention to arrange a system such that intermittent reception can be performed at an appropriate frequency from the relationship between the interval of the intermittent reception and a hopping pattern.

It is still another object of the present invention to arrange a system such that the interval of intermittent reception equals an integer multiple of one period of a hopping pattern.

It is still another object of the present invention to arrange a system such that one period of a hopping pattern is aliquot by the interval of intermittent reception.

According to one aspect, the present invention which achieves these objectives relates to a radio communication system including at least one radio communication apparatus, and a radio control apparatus, connected to the radio communication apparatus via radio waves, for performing communication using a frequency hopping method. The radio control apparatus includes a frequency determination unit for determining frequencies to be used in frequency hopping communication, a hopping-pattern configuration unit for configuring a hopping pattern based on the frequencies determined in the frequency determination unit, a notification unit for notifying the radio communication apparatus of the hopping pattern configured by the hopping-pattern configuration unit, an instruction unit for instructing an end of intermittent reception to the radio communication apparatus, and a first control unit for performing control. When the frequency determination unit has redetermined frequencies while the radio communication apparatus performs the intermittent reception, the instruction unit instructs the end of the intermittent reception, the hopping-pattern configuration unit reconfigures the hopping pattern, and the notification unit notifies the reconfigured hopping pattern. The radio communication apparatus includes an intermittent reception unit for performing intermittent reception based on the hopping pattern notified by the notification unit, and a second control unit for performing control such that, when the instruction of the end of the intermittent reception from the instruction unit has been received, the intermittent reception is ended, and the radio communication apparatus shifts to a state of receiving the notification of the hopping pattern from the notification unit.

According to another aspect, the present invention which achieves these objectives relates to a radio control apparatus, accommodating at least one radio communication apparatus, for performing communication using a frequency hopping method. The radio control apparatus includes a frequency determination unit for determining frequencies to be used in frequency hopping communication, a hopping-pattern configuring unit for configuring a hopping pattern based on the frequencies determined by the frequency determination unit, a notification means for notifying the radio communication apparatus of the hopping pattern configured by the hopping-pattern configuring unit, an instruction unit for instructing an end of intermittent reception to the radio communication apparatus, and a control unit for performing control. When the frequency determination unit has redetermined frequencies while the radio communication apparatus performs the intermittent reception, the instruction unit instructs the end of the intermittent reception, the hopping-pattern configuring unit reconfigures the hopping pattern, and the notification unit notifies the reconfigured hopping pattern.

According to still another aspect, the present invention which achieves these objectives relates to a radio communication apparatus, accommodated in a radio control apparatus, for performing communication using a frequency hopping method. The radio communication apparatus includes an intermittent reception unit for intermittently receiving control information transmitted from the radio control apparatus based on a hopping pattern, an intermittent-reception ending unit for ending the intermittent reception when the intermittent reception unit has received an instruction of an end of the intermittent reception transmitted from the radio control apparatus, and a shift unit for shifting the radio communication apparatus to a state of receiving the notification of the hopping pattern from the radio control apparatus when the intermittent-reception ending unit has ended the intermittent reception.

According to still another aspect, the present invention which achieves these objectives relates to a radio communication apparatus, accommodated in a radio communication apparatus, for performing communication using a frequency hopping method. The radio communication apparatus includes a storage unit for storing a hopping pattern, a time counting unit for counting a time period obtained by dividing or multiplying one period of the hopping pattern stored in the storage unit by an integer equal to or greater than 2, and an intermittent reception unit for performing intermittent reception at a frequency within the hopping pattern corresponding to the counted time period when the counting has been performed by the time counting unit.

According to still another aspect, the present invention which achieves these objectives relates to a method for controlling a radio communication system including at least one radio communication apparatus, and a radio control apparatus, connected to the radio communication apparatus via radio waves, for performing communication using a frequency hopping method. The control method includes the steps of, in the radio control apparatus, determining frequencies to be used in frequency hopping communication, configuring a hopping pattern based on the frequencies determined in the frequency determining step, notifying the radio communication apparatus of the hopping pattern configured by the hopping-pattern configuring step, instructing an end of intermittent reception to the radio communication apparatus, and performing control. When the frequency determining step has redetermined frequencies while the radio communication apparatus performs the intermittent reception, the instructing step instructs the end of the intermittent reception, the hopping-pattern configuration step configures the hopping pattern, and the notifying step notifies the reconfigured hopping pattern. The control method also includes, in the radio communication apparatus, the steps of performing the intermittent reception based on the hopping pattern notified from the radio communication apparatus, and performing control such that, when the end of the intermittent reception has been instructed from the radio control apparatus while the intermittent reception step perfoms the intermittent reception, the radio communication apparatus shifts to a state of receiving the notification of the hopping pattern from the radio control apparatus by ending the intermittent reception.

According to still another aspect, the present invention which achieves these objectives relates to method for controlling a radio control apparatus, accommodating at least one radio communication apparatus, for performing communication using a frequency hopping method. The control method includes the steps of determining frequencies to be used in frequency hopping communication, configuring a hopping pattern based on the frequencies determined in the frequency determinating step, notifying the radio communication apparatus of the hopping pattern configured in the hopping-pattern configuring step, instructing an end of intermittent reception to the radio communication apparatus, and performing control. When the frequency determinating step has redetermined frequencies while the radio communication apparatus performs the intermittent reception, the instruction step instructs the end of the intermittent reception, the hopping-pattern configuring step reconfigures the hopping pattern, and the notifying step notifies the reconfigured hopping pattern.

According to still another aspect, the present invention which achieves these objectives relates to a method for controlling a radio communication apparatus, accommodated within a radio control apparatus, for performing communication using a frequency hopping method. The control method includes the steps of performing intermittent reception based on a hopping pattern notified from the radio communication apparatus, and performing control such that, when the end of the intermittent reception has been instructed from the radio control apparatus while the intermittent reception step perfoms the intermittent reception, the radio communication apparatus shifts to a state of receiving the notification of the hopping pattern from the radio control apparatus by ending the intermittent reception.

According to still another aspect, the present invention which achieves these objectives relates to a method for controlling a radio communication apparatus, accommodated in a radio control apparatus, for performing communication using a frequency hopping method. The control method includes the steps of storing a hopping pattern, counting a time period obtained by dividing or multiplying one period of the hopping pattern stored in the storing step by an integer equal to or greater than 2, and performing intermittent reception at a frequency within the hopping pattern corresponding to the time period counted in the time counting step.

The foregoing and other objects, advantages and features of the present invention will become more apparent from the following description of the preferred embodiment taken in conjunction with the accompanying drawings.

BRIEF DESCRIPTION OF THE DRAWINGS

FIG. 6 is a diagram illustrating the internal configuration of respective channels used in the embodiment;

FIG. 15 is a flowchart illustrating the operation when radio-wave environment is degraded in a conventional central control stat in;

FIG. 17 is a diagram illustrating the operation sequence when changing a hopping pattern in a conventional system.

DESCRIPTION OF THE PREFERRED EMBODIMENTS

System configuration

Figure 1:
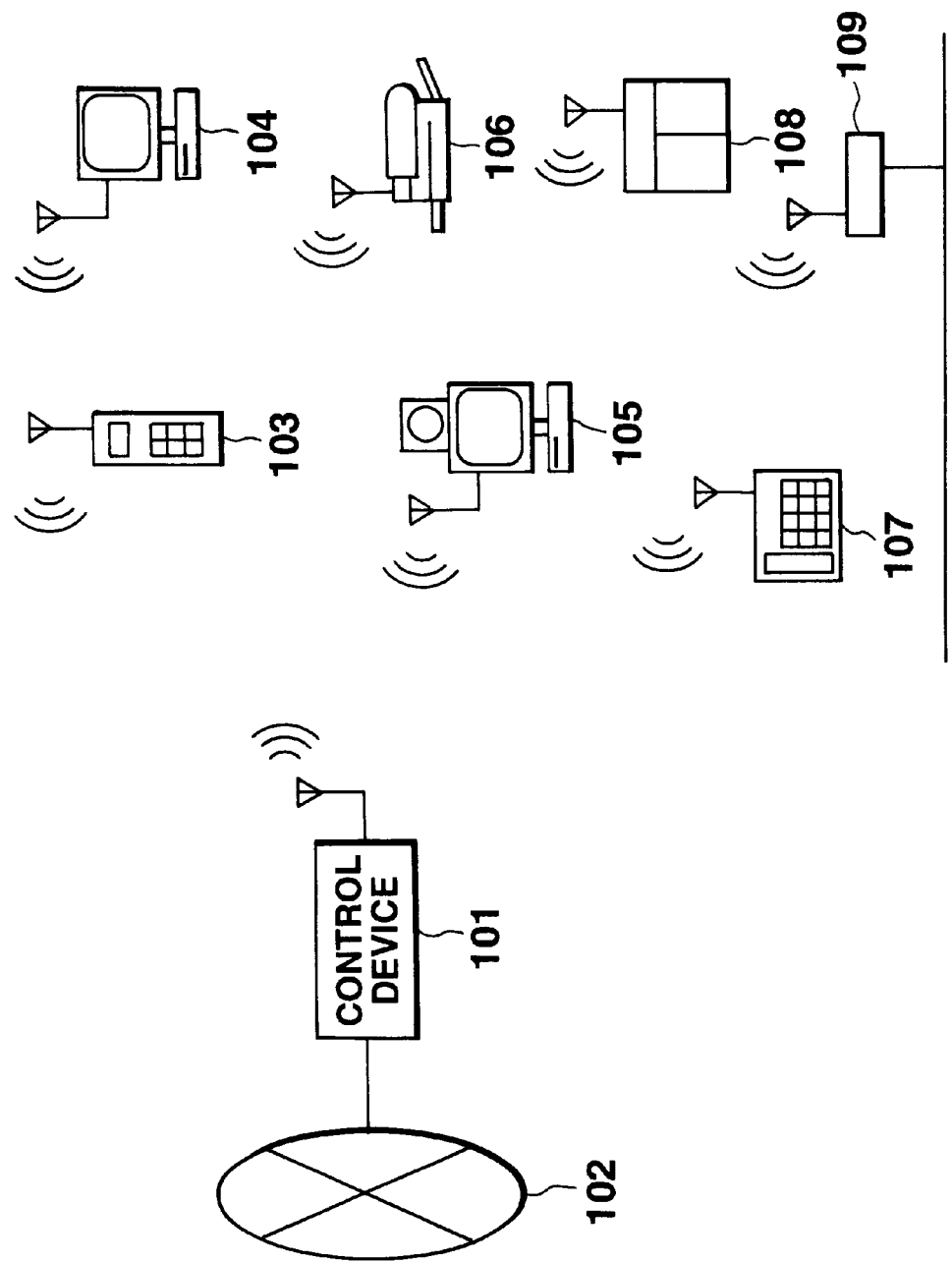
FIG. 1 is a schematic diagram illustrating the configuration of a radio communication system according to an embodiment of the present invention.

FIG. 1 is a schematic diagram illustrating the configuration of a radio communication apparatus according to a preferred embodiment of the present invention.

This radio communication system includes a central control station for controlling communication between terminals provided within the system, and terminal stations. Radio communication is performed between terminal stations using a frequency hopping method based on control data assigned from the central control station, using a radio frame (to be described later) of the system.

An arbitrary one or more of the terminal stations within the system may be used as the central control station.

Respective terminals constituting the system will now be described in detail.

The radio communication system includes a public network 102, a network control device 101 for supplying terminal stations within the system with public network communication services, a radio telephone set 103 which performs voice conversation via the public network 102 by exchanging control data or voice data with the central control station or other terminal stations, and which also performs so-called interextension conversation with a plurality of terminal stations, and radio data terminals (104–109) each of which performs communication of control data and data communication with the central control station or another terminal station.

The entirety of the radio telephone set 103 and the radio data terminals 104–109 will be hereinafter termed a "radio terminal 110".

The radio data terminals (104–109) indicate terminal apparatuses having the function of transmitting/receiving data in a burst-like manner (data terminals) or data input/output apparatuses to which a radio adapter for performing radio communication is connected, or apparatus obtained by integrating such apparatuses. For example, a computer 104, a multimedia terminal 105, a printer 106, a facsimile apparatus 107, a copier 108 and a LAN (local area network) gateway 109 shown in FIG. 1, as well as other apparatuses, such as an electronic camera, a video camera, a scanner and the like, are radio data terminals.

The radio communication system of the present embodiment has the feature that the radio telephone set 103 and the radio data terminals 104–109 can freely communicate with each other and can also access the public network 102. The detailed configurations and operations of these apparatuses will now described.

(1) Radio telephone set

Figure 2:
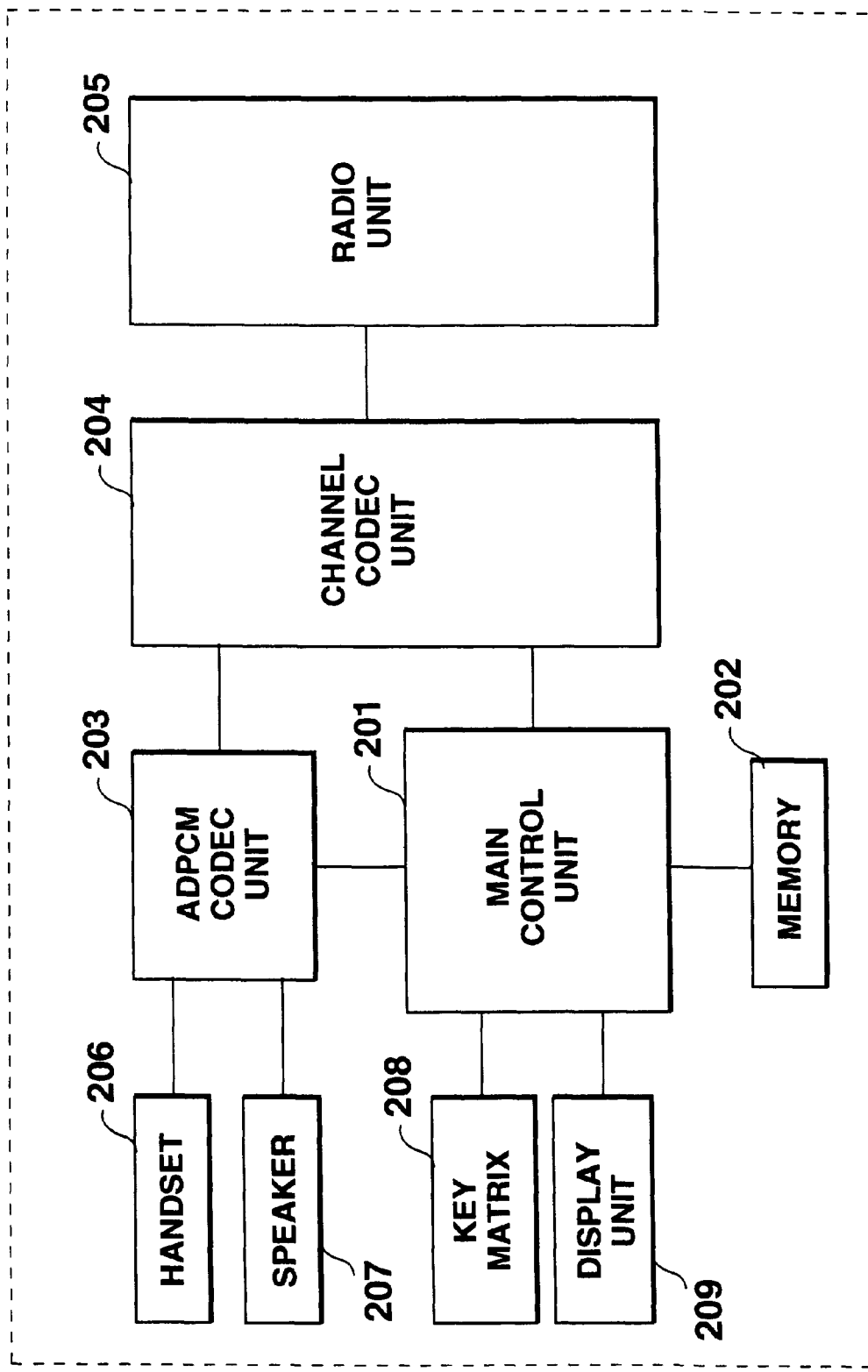
FIG. 2 is a block diagram illustrating the internal configuration of a radio telephone set used in the embodiment.

FIG. 2 is a diagram illustrating the internal configuration of the radio telephone set 103.

A main control unit 201 controls the entire radio telephone set 103. A memory 202 includes a ROM (read-only memory) which stores control programs of the main control unit 201, an EEPROM (eletrically erasable and programmable read-only memory) which stores a call sign (system ID) of the radio communication system and a sub-ID of the radio telephone set 103, a RAM (random access memory) which serves as work areas for control, for example, when storing terminal-type information in the processing of the main control unit 201, and the like.

An ADPCM (adaptive differential pulse code modulation) CODEC unit 203 is connected to a handset 206 and a speaker 207, and converts analog voice information into ADPCM codes, and vice versa. A channel CODEC unit 204 includes a register for storing basic hopping pattern information, and has the function of performing processing, such as scrambling or the like, for information subjected to frequency switching, intermittent reception, carrier detection, level detection, bit synchronization, and conversion into ADPCM codes, performing time-division multiplexing of the information into a predetermined frame, and performing transmission/reception of a radio unit 205 (to be described later). Data assembled in a radio frame (to be described later) is transmitted to the central control station or a target terminal station via the radio unit 205.

The radio unit 205 modulates digital information from the channel CODEC unit 204 to convert it into a form so as to be transmittable via radio waves and transmits the obtained signal to an antenna, and demodulates information reveived from the antenna via radio waves to convert it into digital information. The handset 206 inputs/outputs a conversation voice signal. The speaker 207 outputs voice represented by a voice signal, as well as a ringing tone and the like. A key matrix 208 includes a dial keypad for inputting a dial number or the like, and function keys, such as an outside-line key, a holding key, a speaker key and the like. A display unit 209 displays a call-receiving state, a dial number input through the key matrix 208, a state of use of the public network, or the like.

(2) Radio adapter

Figure 3:
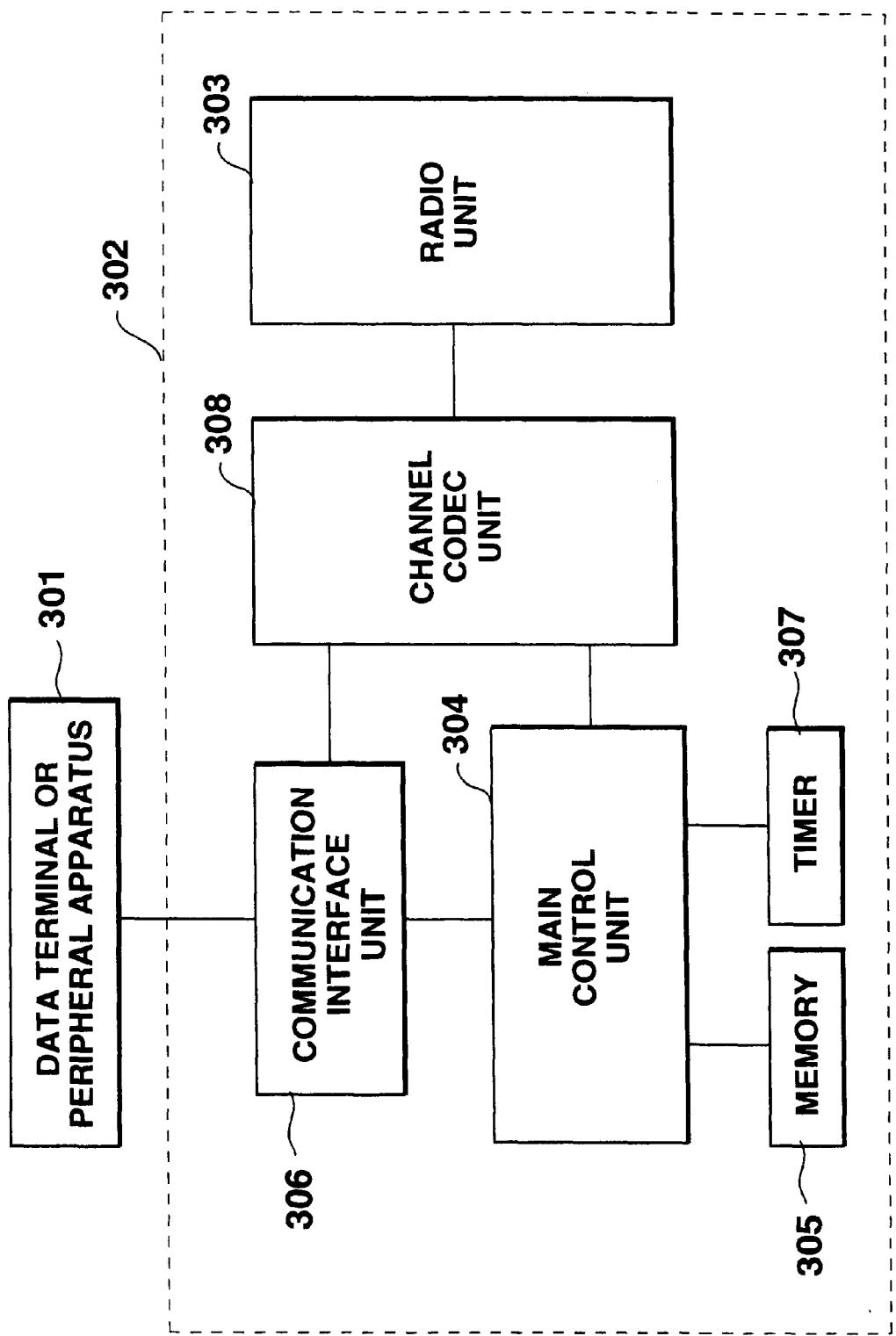
FIG. 3 is a block diagram illustrating the internal configuration of a radio adapter used in the embodiment.

FIG. 3 is a block diagram illustrating the internal configuration of a radio adapter connected to or incorporated in each of the radio data terminals 104–109 shown in FIG. 1.

In FIG. 3, reference numeral 301 represents a data terminal such as a computer, or a peripheral apparatus such as a printer, a facsimile apparatus or the like. A radio adapter 302 can be connected to the data terminal or the peripheral apparatus via a communication cable or an internal bus. A radio unit 303 incorporated in the radio adapter 302 modulates digital information from a channel CODEC unit 308 (to be described later) to convert it into a form so as to be transmittable via radio waves and transmits the obtained signal to an antenna, and demodulates information received from the antenna via radio waves to convert it into digital information. A main control unit 304 includes a CPU (central processing unit), peripheral devices for performing interrupt control, DMA (direct memory access) control and the like, an oscillator for generating a system clock signal, and the like, and controls respective units in the radio adapter 302. A memory 305 includes a ROM which stores control programs, an EEPROM which stores a call sign (system ID) of the radio communication system and an ID of the radio adapter, a RAM which serves as work areas for control, for example, when storing terminal-type information in the processing of the main control unit 304, and the like.

Figure 5:
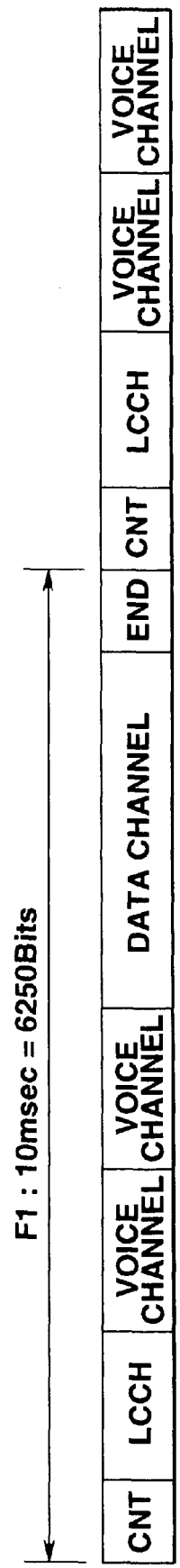
FIG. 5 is a diagram illustrating the internal configuration of a frame used in the embodiment.

A communication interface unit 306 controls communication by the radio adapter 302 using, for example, a communication interface, such as RS232C, Centronix, LAN or the like, an internal bus of a personal computer or a work station, such as an ISA (Industry Standard Architecture) bus or a PCMCIA (Personal Computer Memory Card International Association) interface, or the like, included in the data terminal or the peripheral apparatus 301. A timer 307 provides timing information used by respective units within the radio adapter 302. The channel CODEC unit 308 has the function of performing assembly and disassembly of a radio frame as shown in FIG. 5 (to be described later), controlling simple error detection processing represented by CRC (cyclic redundancy check), scramble processing, switching of transmission/reception of the radio unit 303, frequency switching and the like, and performing carrier detection, level detection and bit synchronization.

(3) Network control device

Figure 4:
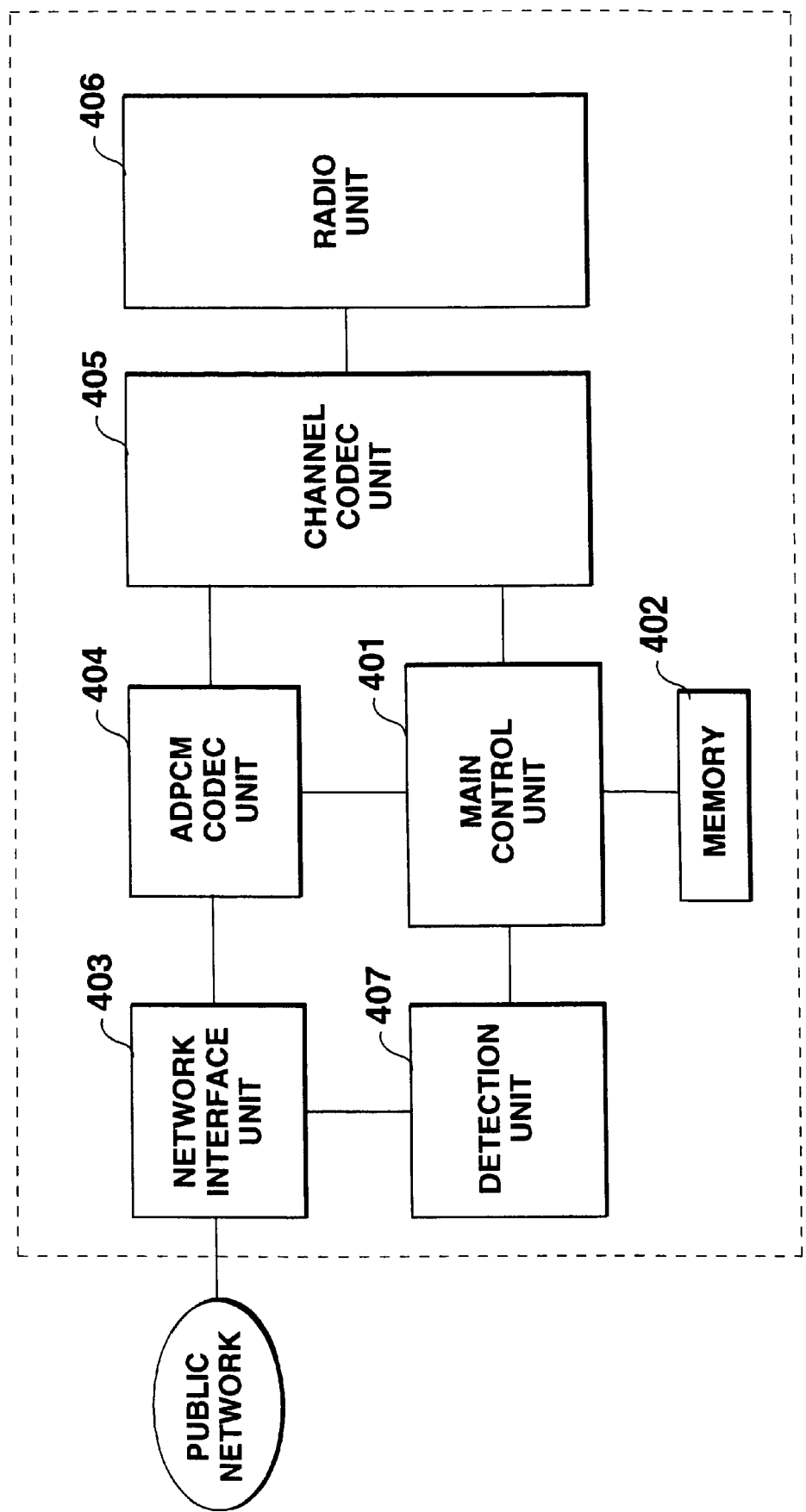
FIG. 4 is a block diagram illustrating the internal configuration of a network control device used in the embodiment.

FIG. 4 is a block diagram illustrating the internal configuration of the network control device 101 shown in FIG. 1.

In FIG. 4, a main control unit 401 controls the entire network control device 101. It determines a basic hopping pattern (hereinafter abbreviated as an "HP") used in the system, and controls the respective terminal stations. A memory 402 includes a ROM which stores control programs, an EEPROM which stores a call sign (system ID) of the radio communication system and a sub-ID of the radio apparatus, a RAM which serves as work areas for control, for example, when storing terminal-kind information in the processing of the main control unit 401, and the like. A network interface unit 403 peforms the control of the public network 102, such as the transmission of a selection command for accommodating the public network 102, the closing of a DC loop, 2-line/4-line conversion, PCM (pulse code modulation) conversion and the like, and the processing of receiving a selection command/transmitting a call command. An ADPCM CODEC unit 404 has the function of converting an analog voice signal received by the network interface unit 403 via the public network 102 into ADPCM codes, transferring the obtained signal to a channel CODEC unit 405 (to be described later), and converting an ADPCM-coded voice signal from the channel CODEC unit 405 into an analog voice signal.

The channel CODEC unit 405 has the function of storing the basic hopping pattern in a register, performing processing, such as scrambling or the like, and time-division multiplexing into a predetermined frame for ADPCM-coded information, controlling switching of transmission/reception and frequency switching of a radio unit 406 (to be described later), and performing intermittent reception processing, carrier detection, level detection and bit synchronization. The channel CODEC unit 405 also transmits data configured in a radio frame (to be described later) to the control station or a target radio terminal via the radio unit 406.

The radio unit 406 modulates information configured in a frame from the channel CODEC unit 405 to convert it into a form so as to be transmittable via radio waves and transmits the obtained signal to an antenna, and demodulates information received from the antenna via radio waves to convert it into digital information. A detection unit 407 performs detection of call-receiving and loop detection, and transmits various tones, such as a PB (push button) signal, a dial tone, a call-receiving tone and the like. The operation of the radio frame FIG. 5 is a diagram illustrating the internal configuration of a frame used in the embodiment. In FIG. 5, CNT represents a system control channel, and LCCH represents a logic control channel. Voice data is bidirectionally exchanged using two voice channels, and large-capacity data communication is performed using a data channel. END represents a guard time for changing the frequency in order to perform frequency hopping in the next frame. As shown in FIG. 5, the frame used in the embodiment includes six channels, i.e., CNT, LCCH, the two voice channels, the data channel, and END.

FIG. 6 illustrates the internal configuration of each of the channels. In FIG. 6, CS represents a carrier sensing time period equal to 12.8 $\mu$sec, PR represents a 56-bit preamble for catching bit synchronism, SYN represents a frame synchronizing signal including a dummy bit+31 bits, ID represents a 63-bit ringing signal+a dummy bit, BF represents 8-bit basic-frame-number information (cycling between 1 and 20), WA represents a field where the system address of a terminal to be started from among terminals in a sleeve mode, and address information for simultaneously controlling all terminals are written, NF represents information relating to the frequency to be used for the next frame, and Rev represents an area number for discrimination from the adjacent cell. GT represents a guard time, CS0, CS1 and CS2 represent carrier sensing time periods, DA represents a field where system addresses, such as the addresses of terminals to which information is to be transmitted, a global address to be received by all terminals, and the like. CRC of the system control channel represents CRC information from BF to Rev, CRC of the logic control channel represents CRC information for data, CRC of the voice channel represents CRC information of T/R, CF represents a guard time for frequency switching, and T/R represents information relating to a 32-bps (bits per second) B channel. Each numeral shown in FIG. 6 indicates the number of bits which shows the length of each portion.

The CNT channel is transmitted when the central control station starts the frame. Stations other than the central control station must receive the CNT channel in order to obtain bit synchronism and frame synchronism during an ordinary operation. A terminal station obtains the basic hopping pattern based on NF in the CNT frame when the power supply is turned on. During intermittent reception, each of the stations other than the central control station receives the CNT channel at an arbitrary frequency at a predetermined time interval in order to establish bit synchronism and frame synchronism. During intermittent reception, when address information within WA coincides with the address of the user's own terminal, the intermittent reception is terminated, and the terminal shifts to a state of always receiving the CNT frame.

The LCCH channel is used, for example, when performing the connection or disconnection of a radio channel at the initial registration of a terminal station, or exchanging a request for the allocation or the release of the allocation of the hopping pattern with the central control station before the connection or disconnection of the radio channel, respectively, or notifying the central control station of the shift of the state when the terminal station shifts from intermittent reception to an ordinary operation. The connection or disconnection of the radio channel is peformed by writing the address of the system to be communicated within the DA field provided within the LCCH channel, and directly communicating with that system.

When performing data communication with all terminals (irrespective of the central control station or terminal stations) accommodated in the system, a global address which can be recognized by all the terminals is written in the DA field, and LCCH is transmitted while including control data, such as a request for start, a request for registration, kind information and the like, in the DATA portion.

Voice conversation is realized by using one of voice channels for transmission and using another voice channel for reception. The channel to be used for transmission is determined by negotiating with the communication partner through the LCCH channel exchanged when connecting the radio channel.

The data channel determines how data transmission is to be performed by negotiating with the communication partner through the LCCH channel exchanged when connecting the radio channel.

Explanation of the configuration and the operation of the channel CODEC unit

Figure 7:
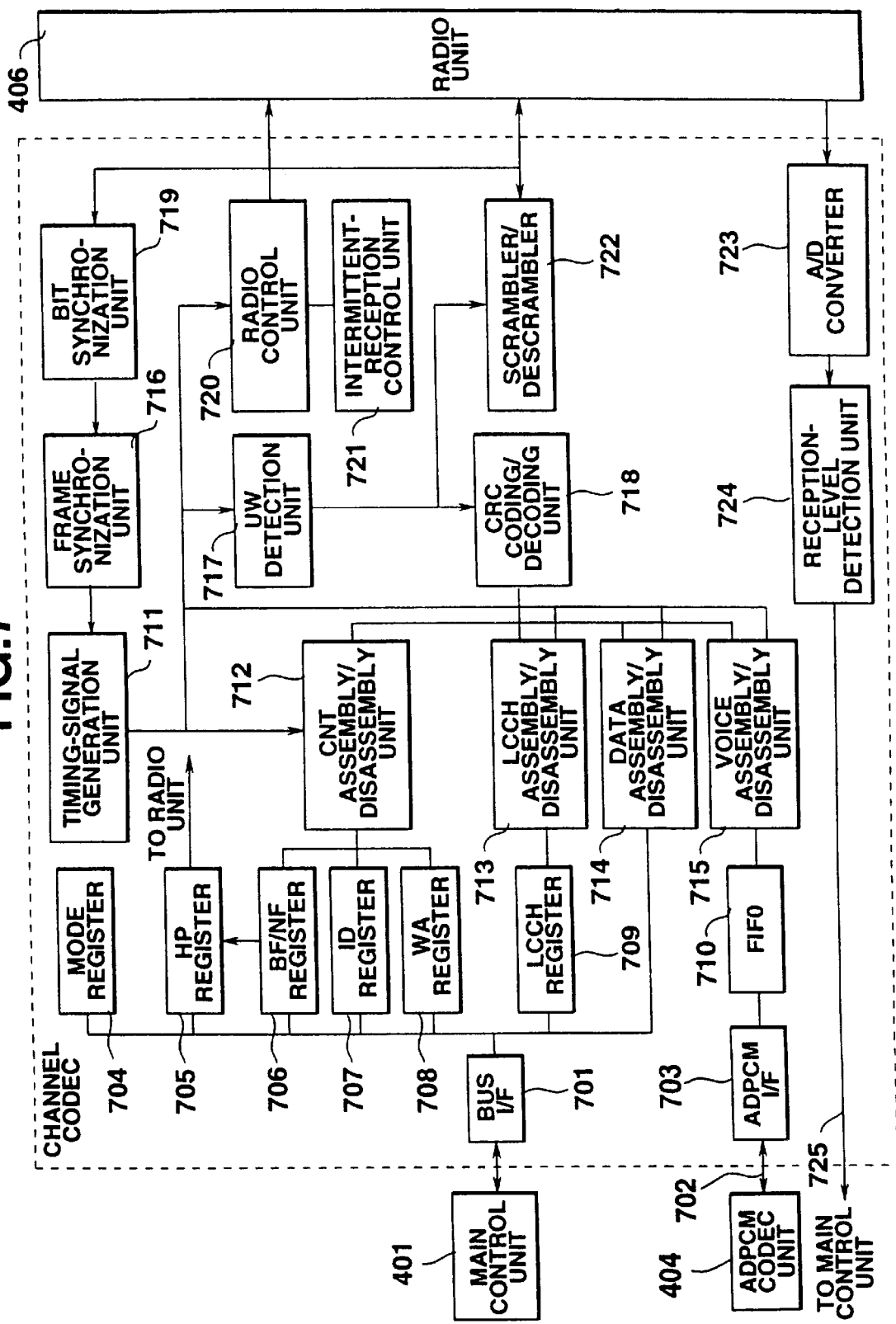
FIG. 7 is a block diagram illustrating the configuration of a channel CODEC (coder-decoder) unit used in the embodiment.

FIG. 7 illustrates the internal configuration of the channel CODEC unit. The operation of the unit will now be described.

The channel CODEC unit mainly controls the main control unit, assembly/disassembly of data to be transmitted into frames, transmission/reception of voice data with the ADPCM CODEC unit and assembly/disassembly of the data into a frame, and transmission/reception of the data frame of the radio unit.

In FIG. 7, reference numeral 701 represents a bus interface. An ADPCM bus 702 effects transmission/reception of digital voice data between the ADPCM CODEC unit 404 and the ADPCM interface unit 703 serially or in parallel. There are also shown a mode register 704 for setting an operation mode, a hopping-pattern register 705, a frame number/next-frequency number (BF/NF) register 706, a system-ID register 707, an intermittent-start-terminal-address (WA) register 708, a LCCH register 709, a FIFO (first-in first-out) buffer 710, a timing-signal generation unit 711, a CNT-channel assembly/disassembly unit 712, a LCCH (logic control channel) assembly/disassembly unit 713, a data assembly/disassembly unit 714, a voice assembly/disassembly unit 715, a frame synchronization unit 716, a unique-word detection unit 717 (uw deletion unit), a CRC coding/decoding unit 718, a bit synchronization unit 719, a radio control unit 720, an intermittent-reception control unit 721, a scrambler/descrambler 722, an A/D (analog-to-digital) converter 723, a reception-level detection unit 724, and an interrupt signal line 725 to the main control unit.

The operation of the channel CODEC unit will now be described with reference to FIG. 7.

The operational timing of the channel CODEC unit is generated by the timing-signal generation unit 711 of the channel CODEC unit.

In the central control station, the main control unit writes necessary values in the HP (basic hopping pattern) register 705, the ID register 707 and the WA (start-terminal address) register 708, reads the contents of these registers in accordance with timing signals from the timing-signal generation unit 711, and assembles and transmits a frame. The terminal station which has received the frame maintains frame synchronism in accordance with frame synchronizing words, and stores the received frame in the HP register 705, the ID register 707 and the WA register 708 within the channel CODEC unit.

The values stored in the frame number/next-frame-frequency number (BF/NF) register 706 are updated in synchronization with the timing signal from the timing-signal generation unit 711.

The channel CODEC unit reads data stored in these registers at the timing of data transmission of the CNT channel. The CNT assembly/disassembly unit 712 assembles the read data and transmits the obtained data to the radio unit.

In the terminal station, upon reception of data from the radio unit through the CNT channel, the CNT assembly/disassembly unit 712 disassembles the received data and performs processing using the values of respective portions of the received data. Control is performed so that succeeding data is received only when the received system ID coincides with the value written in the ID register 707 of the terminal station. When the value of WA received during intermittent reception coincides with the value of the WA register 708, a start request interrupt is output to the main control unit so as to shift to the control of always receiving the CNT signal. In addition, by utilizing the received BF/NF information data, the table of the HP register 705 is updated.

In the present embodiment, as shown in FIG. 5, one frame is dedicated for one frequency. However, a configuration may also be adopted in which the number of the frequency written in the NF field is for the hopping pattern of the CNT channel, and the hopping pattern used in the voice channel and the data channel is generated by shifting the value of the hopping-pattern register formed based on the number of the frequency written in the NF field in time.

In the LCCH channel, data stored in the LCCH register 709 within the channel CODEC unit by the main control unit of the radio terminal at the transmission side is assembled by the LCCH assembly/disassembly unit 703, and the obtained signal is transmitted to the radio unit at a predetermined timing. In the radio terminal which has received that signal, the LCCH assembly/disassembly unit 713 disassembles the received LCCH data. When the DA1 address or the DA2 address within the LCCH coincides with the address of the terminal, the received data is stored in the LCCH register 709 within the channel CODEC. Then an interrupt is generated and sent to the main control unit, which reads the stored data.

In the voice channel, a voice signal input from the handset, the public network or the like is subjected to digital encoding by the ADPCM CODEC unit 404, and the obtained signal is received in the channel CODEC unit via the ADPCM bus 702 and the ADPCM interface 703. In the channel CODEC unit, the voice assembly/disassembly unit 715 assembles the input data and transmits the obtained data to the radio unit at a predetermined timing. On the other hand, voice data received from the radio unit is disassembled by the voice assembly/disassembly unit 715. The obtained signal is output to the ADPCM CODEC unit 404 via the ADPCM interface 703 and the ADPCM bus 702 at a timing of synchronizing with 8-kHz clock pulses, and is subjected to D/A (digital-to-analog) conversion by the ADPCM CODEC unit, and the obtained voice is output to the handset or the public network.

In the data channel, data is transmitted only when there is a request for data transmission from the main control unit. When the request for data transmission is being performed, the bus interface unit 701 of the channel CODEC unit outputs a request for data transmission to the main control unit at the timing of every byte. When the main control unit has responded to the request for data transmission and data within the working memory has been written in the channel CODEC unit via the bus interface 701, the data assembly/disassembly unit 714 serially converts the data and transmits the obtained data to the radio unit at a predetermined timing. On the other hand, when data has been received from the radio unit, the data assembly/disassembly unit 714 performs parallel conversion of the data and outputs a request for data transmission to the main control unit at every byte. The main control unit outputs the received data to the working memory. The data is transferred by an interrupt to the main control unit or by DMA (direct memory access).

When transmitting data, a CRC code is generated by the CRC coding/decoding unit 718 if necessary, and the generated code is stored in the CRC field of the frame and is transmitted. At the reception side, the received frame is subjected to a CRC check by the CRC coding/decoding unit 718 in order to detect the generation of an error. All data to be transmitted other than the frame synchronizing word and the unique word are scrambled by the scrambler/descrambler 722. This operation is performed in order to reduce unbalance in data to be transmitted to the radio unit and to facilitate the extraction of a synchronizing clock signal.

When receiving data, if the unique word is detected by the UW detection unit 717, descrambling is performed by the scrambler/descrambler 722. Then, the CRC coding/decoding unit 718 performs a CRC check, and inputs data to an assembly/disassembly portion of each field.

Radio transmission of voice and data in accordance with a predetermined frame is performed in the above-described manner.

Specific operations of the system will now be described.

In the following description, starting processing indicates that intermittent reception is terminated and the system shifts to an ordinary mode of always receiving the CNT frame.

Restarting processing indicates the same processing as when acquiring a frequency when the power supply is turned on.

Figure 8:
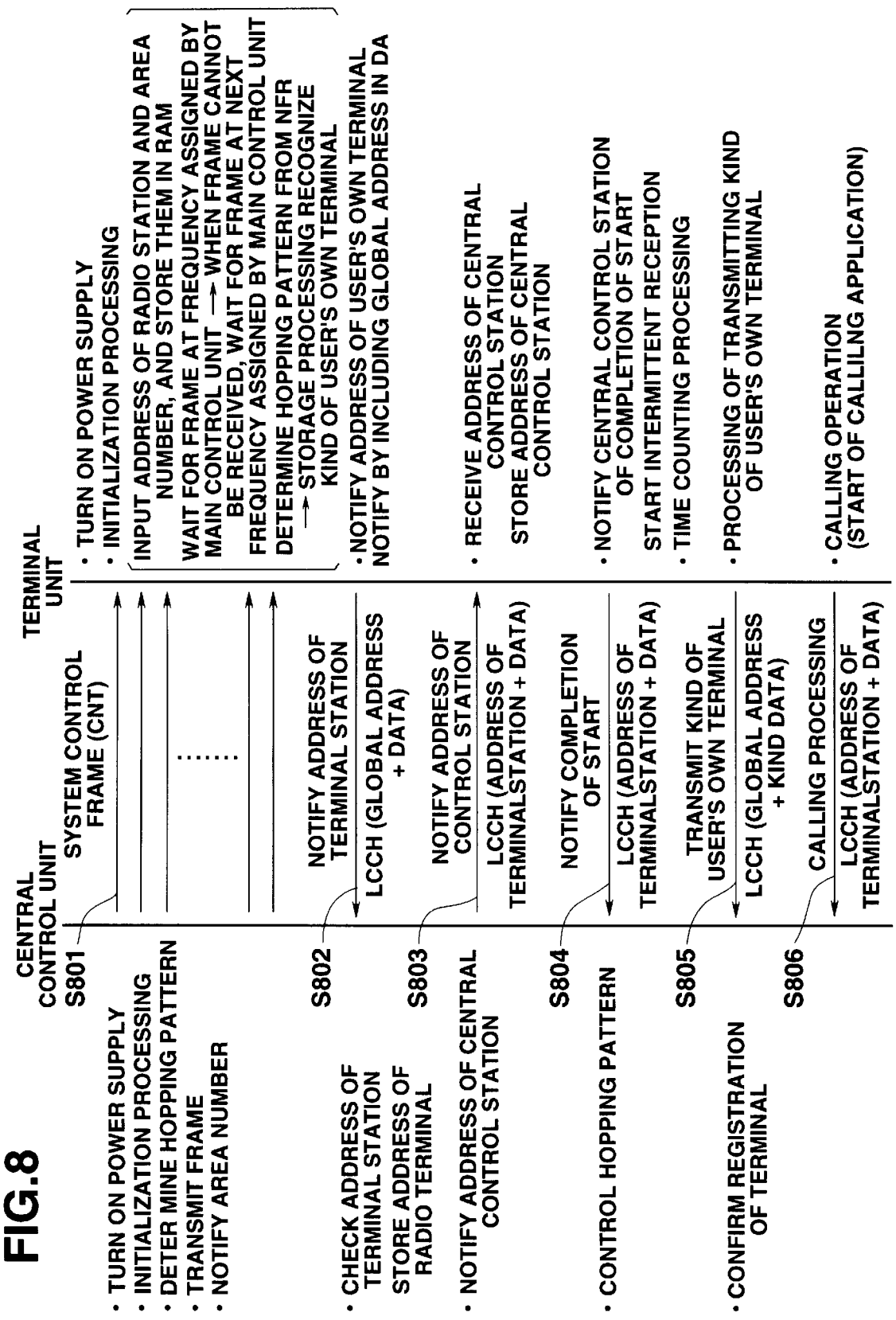
FIG. 8 is a diagram illustrating a sequence when power supplies are turned on between a central control station and a terminal station used in the embodiment.

1. Processing when the power supply is turned on (1) The sequence of the control station and the terminal station when the power supply is turned on FIG. 8 illustrates a sequence indicating the operation of the central control station and the terminal station when the power supplies are turned on in the system.

In step S801, the power supplies are turned on, and the terminal is initialized. In the initializing processing, the terminal determines whether the terminal is the central control station or a terminal station. If the terminal is recognized as the central control station, the radio-wave environment is measured and the hopping pattern is determined. The synchronizing signal, ID, hopping-pattern information, the terminal's area number and the like are assembled in a frame, and the resultant frame is output as the CNT frame at every predetermined timing.

Similarly, after starting the terminal, when the terminal is recognized as a terminal station in the initializing processing, the address of the terminal and the area number of the central control station from which information is to be received are stored. The address of each predetermined extension group, a global address to be received by the entire system, and the like are also stored.

Upon completion of the above-described processing, the CNT frame from the central control station is awaited at an arbitrary frequency. Upon reception of the CNT frame from the central control station, the frequency to which the current frequency is to hop at the next unit time is acquired according to NF within the frame based on the area number. The terminal station changes the frequency to the acquired frequency, and awaits the next CNT frame. By repeating this processing, the terminal station recognizes the hopping pattern used by the central control station and stores the pattern in the channel CODEC.

Upon completion of the storage of the hopping pattern in the terminal station, then, in step S802, the terminal station notifies using an LCCH frame that it newly operates as a terminal station. At that time, a global address to be received by all terminals is included in DA of the LCCH frame, and data indicating that new registration is to be performed is included in the data portion. When the central control station receives the LCCH frame and the global address is present in DA of the received LCCH frame, it receives data of the data portion. When the address of the terminal station and a registration-request signal are present, the address and the type information of the terminal station are stored and are newly registered based on the received information.

Upon completion of the registration, then, in step S803, the central control station notifies the newly registered terminal station of the address of the central control station using the LCCH frame. Upon reception of the address of the central control station via the LCCH frame, the terminal station stores the address of the central control station. Upon completion of the storage processing, then, in step S804, the terminal station notifies the central control station of the completion of start using the LCCH frame. When the notification of the completion of start of the terminal station has been transmitted to the central control station, an operating state is provided, and time counting processing is performed and the type of the terminal is output at every predetermined time interval using the LCCH. The central control station and other terminal stations store information relating to the type and the address of the concerned terminal using the received terminal-kind information, i.e., store the fact that the concerned terminal station is present within a communicatable range as well as information relating to the frequency for intermittent reception.

After outputting the notification of the completion of start, in step S806, the terminal station can transmit information.

Figure 9:
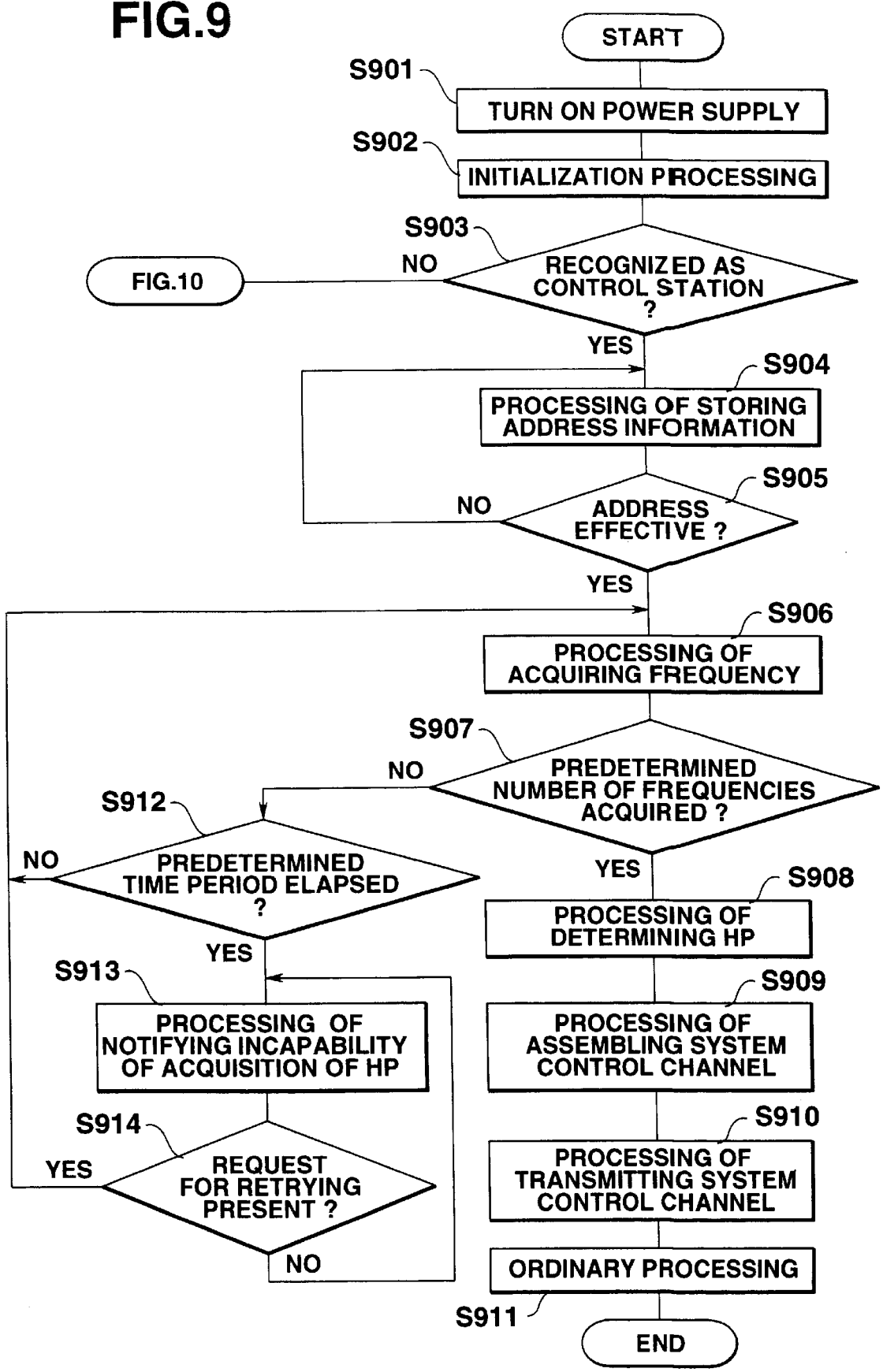
FIG. 9 is a flowchart illustrating the operation when the power supply is turned on in the central control station used in the embodiment.

(2) The operation of the central control station when the power supply is turned on FIG. 9 is a flowchart illustrating the operation of the central control station when the power supply is turned on.

When the power supply of a terminal is turned on in step S901, then, in step S902, the terminal is initialized to provide an operating state. When the terminal is recognized as the central control station in step S903, the process proceeds to step S904, where processing for storing ID information, address information and area information of the terminal is performed. The area information and the terminal-address information may be input by storing values set using a DIP (dual in-line package) switch or the like when starting the terminal, or by receiving values input through a dial keypad of a telephone set or the like, or by receiving values input from a keyboard of a computer or the like via a bus and storing the received values.

When the address information has been stored, it is then determined in step S905 if that value is effective. If the result of the determination is negative, the process returns to step S904, where the processing of storing address information is again performed. If the result of the determination in step S905 is affirmative, the process proceeds to step S906, where processing for determining the frequency to be used is performed. At that time, the central control station performs carrier sensing of all usable frequencies and selects a predetermined number of frequencies that are in a superior radio-wave environment. Then, in step S907, it is determined if the number of the selected frequencies reaches the predetermined number. If the result of the determination is negative, the process proceeds to step S912, where it is determined if the carrier sensing has been performed for a predetermined time period. If the result of the determination in step S912 is negative, the process returns to step S906, where the processing for selecting frequencies is continued. If the result of the determination in step S912 is affirmative, the process proceeds to step S913, where the fact that the central control station could not acquire the predetermined number of frequencies is notified using a display on a picture surface, or a sound. The process then proceeds to step S914, where it is determined if a request for retrying the acquisition of frequencies is present. If the result of the determination is affirmative, the process returns to step S906, where the processing for acquiring frequencies is performed. If the result of the determination in step S914 is negative, the process returns to step S913, where the incapability of acquisition of frequencies is notified.

If the result of the determination in step S907 is affirmative, the process proceeds to step S908, where the hopping pattern is determined using the acquired frequencies. The process then proceeds to step S909, where processing for assembling a CNT frame is performed. The CNT frame includes a synchronizing signal, ID, an area number and frequency information.

Upon completion of the assembly of the CNT frame, then, in step S910, processing for transmitting the CNT frame using a frequency in the hopping pattern is performed. The process then proceeds to step S911, where normal processing of transmitting the CNT frame while changing the frequency based on the determined hopping pattern is performed.

(3) Operation when the power supply is turned on at a terminal station

Figure 10:
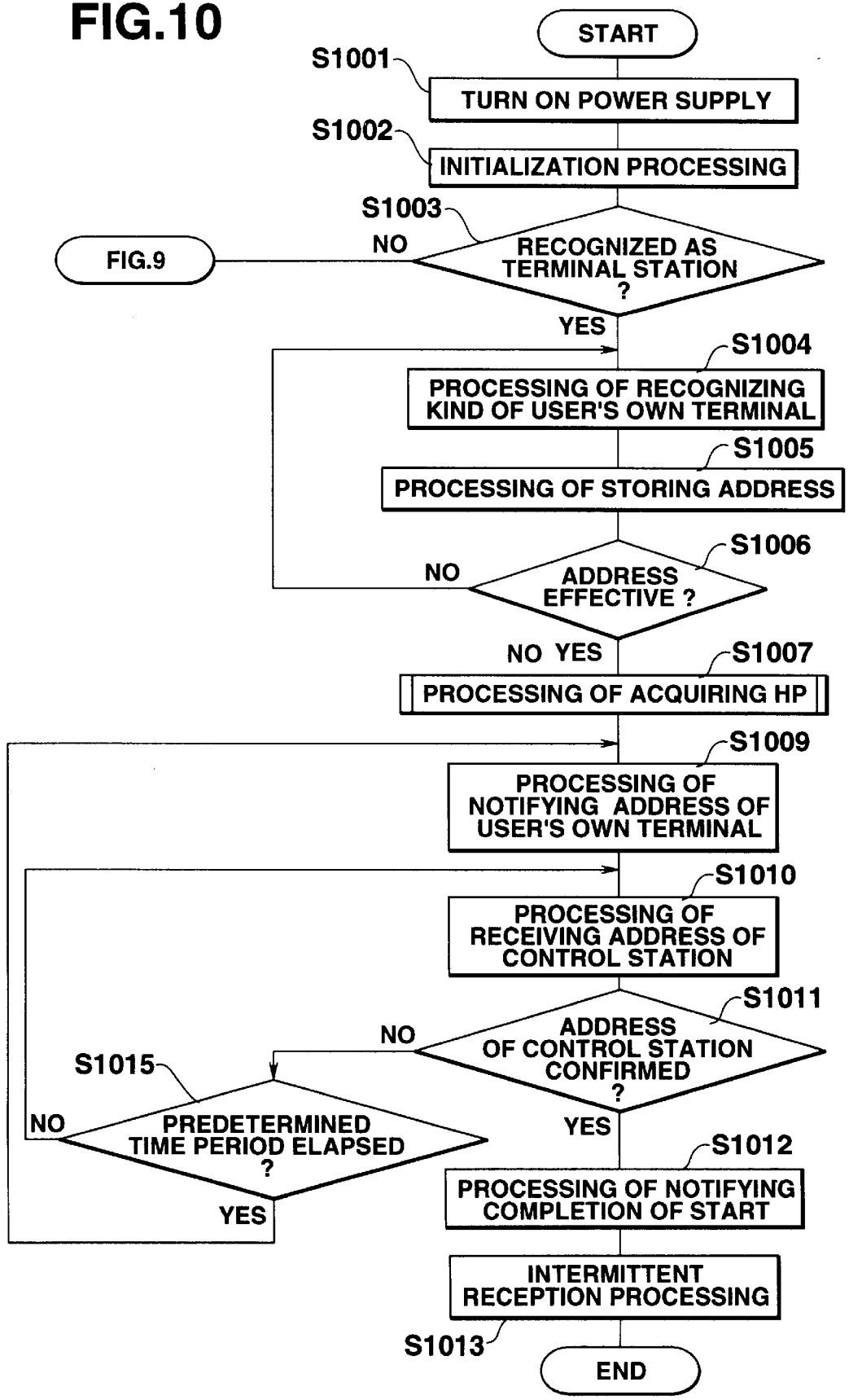
FIG. 10 is a flowchart illustrating the operation when the power supply is turned on in the terminal station used in the embodiment.

FIG. 10 is a flowchart illustrating the operation of a terminal station when the power supply is turned on.

When the power supply of the terminal is turned on in step S1001, the process proceeds to step S1002, where the terminal is initialized and becomes in an operating state. Then, when it has been determined in step S1003 that the terminal is recognized as a terminal station, the process proceeds to step S1004, where the type of the terminal is recognized, i.e., it is recognized whether the terminal is a telephone terminal, a data terminal or a network control terminal. Upon completion of the recognizing processing, processing for storing ID information, address information and area information of the terminal is performed (step S1005). The determination whether the terminal is a terminal station or the central control station may be performed or the area information and the terminal-address information may be input by storing values set using a DIP switch or the like when starting the terminal, or by storing values input through a dial keypad of a telephone set or the like, or by receiving values input from a keyboard of a computer or the like via a bus and storing the received values.

When the address information has been stored, it is then determined in step S1006 if that value is effective. If the result of the determination is negative, the process returns to step S1005, where the processing of storing address information is again performed. If the result of the determination in step S1005 is affirmative, the process proceeds to step S1007, where processing for acquiring the hopping pattern to be used is performed.

Figure 11:
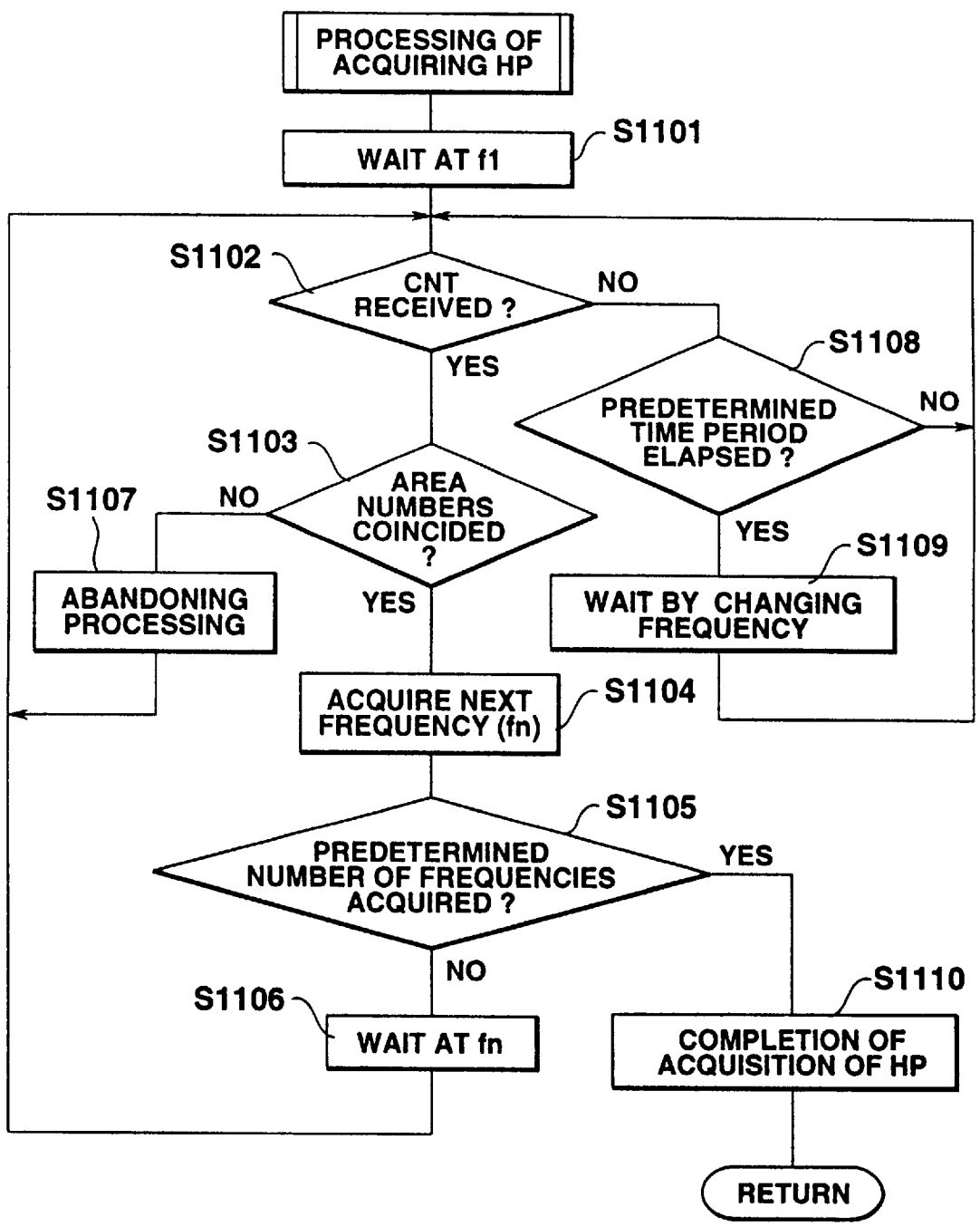
FIG. 11 is a flowchart illustrating processing of acquiring a hopping pattern in the terminal station used in the embodiment.

The processing for acquiring the hopping pattern is shown in FIG. 11. That is, in step S1101, waiting is performed at an arbitrary frequency (for example, fl). It is then determined in step S1102 if a CNT frame has been received. If the result of the determination is negative, the process proceeds to step S1108, where it is determined if a predetermined time period has elapsed. If the result of the determination in step S1108 is negative, the process proceeds to step S1109, where the reception of a CNT frame is awaited by changing the frequency.

If the result of the determination in step S1102 is affirmative, the process proceeds to step S1103, where it is determined if the area number of the Rev portion of the received CNT frame coincides with the area number stored in the terminal. If the result of the determination in step S1103 is negative, the process proceeds to step S1107, where the received CNT frame is abandoned, and the reception of a CNT frame whose area number coincides with the stored area number is awaited.

Thus, waiting is performed by changing the frequency at every predetermined time interval until a CNT frame whose area number coincides with the stored area number is received. When such a CNT frame has been received as a result of the determination in step S1103, the process proceeds to step S1104, where the frequency to which the current frequency hops at the next unit of time is acquired from the NF portion of the CNT frame. It is then determined in step S1105 if the number of acquired frequencies reaches a predetermined number (i.e., the number of the frequencies in the hopping pattern). If the result of the determination in step S1105 is negative, the process proceeds to step 31106, where the frequency shifts to the frequency acquired in step S1104 and the reception of a CNT frame is awaited, and the frequency to which the current frequency shifts at the next unit of time is acquired.

When the number of acquired frequencies has reached the predetermined number by repeating the above-described processing, the acquisition of the hopping pattern is terminated (step S1110), and the acquired hopping pattern is registered in the HP register 705 of the channel CODEC unit.

Upon completion of the acquisition of the hopping pattern, the process proceeds to step S1009 shown in FIG. 10, where processing of notifying the central control station of the address of the terminal station using an LCCH frame is performed. At that time, a global address to be received by all terminals is written in DA in the frame using the LCCH frame, and a request for registration and the address of the terminal are included in the DATA portion, and the resultant signal is transmitted to the central control station. Upon the transmission of the signal, the process proceeds to step S1010, where the terminal station receives the LCCH frame by changing the frequency in accordance with the acquired hopping pattern. The process then proceeds to step S1011, where it is determined if the same address as the address of the terminal is present in DA of the received LCCH frame. If the result of the determination is negative, the process proceeds to step S1015, where it is determined if a predetermined time period has elapsed after transmitting the address of the terminal. If the result of the determination in step S1015 is negative, the process returns to step S1010, where the processing for receiving the address of the central control station in the LCCH frame from the central control station is continued. If the result of the determination in step S1015 is affirmative, the process returns to step S1009, where the processing of notifying the central conrol station of the address of the terminal using the LCCH frame is again performed.

When the address of the terminal has been detected in DA in the LCCH frame from the central control station and data indicating registration in the central control station has been confirmed in the DATA portion as the result of the determination in step S1011, the process proceeds to step S1012, where the LCCH frame is transmitted to the central control station by adding the address of the central control station in DA of the LCCH frame as well as including a signal indicating completion of start in the DATA portion. Upon completion of the output of that signal, the process proceeds to step S1013, where intermittent reception processing is started, and address information of WA within the CNT frame is monitored.

Figure 12:
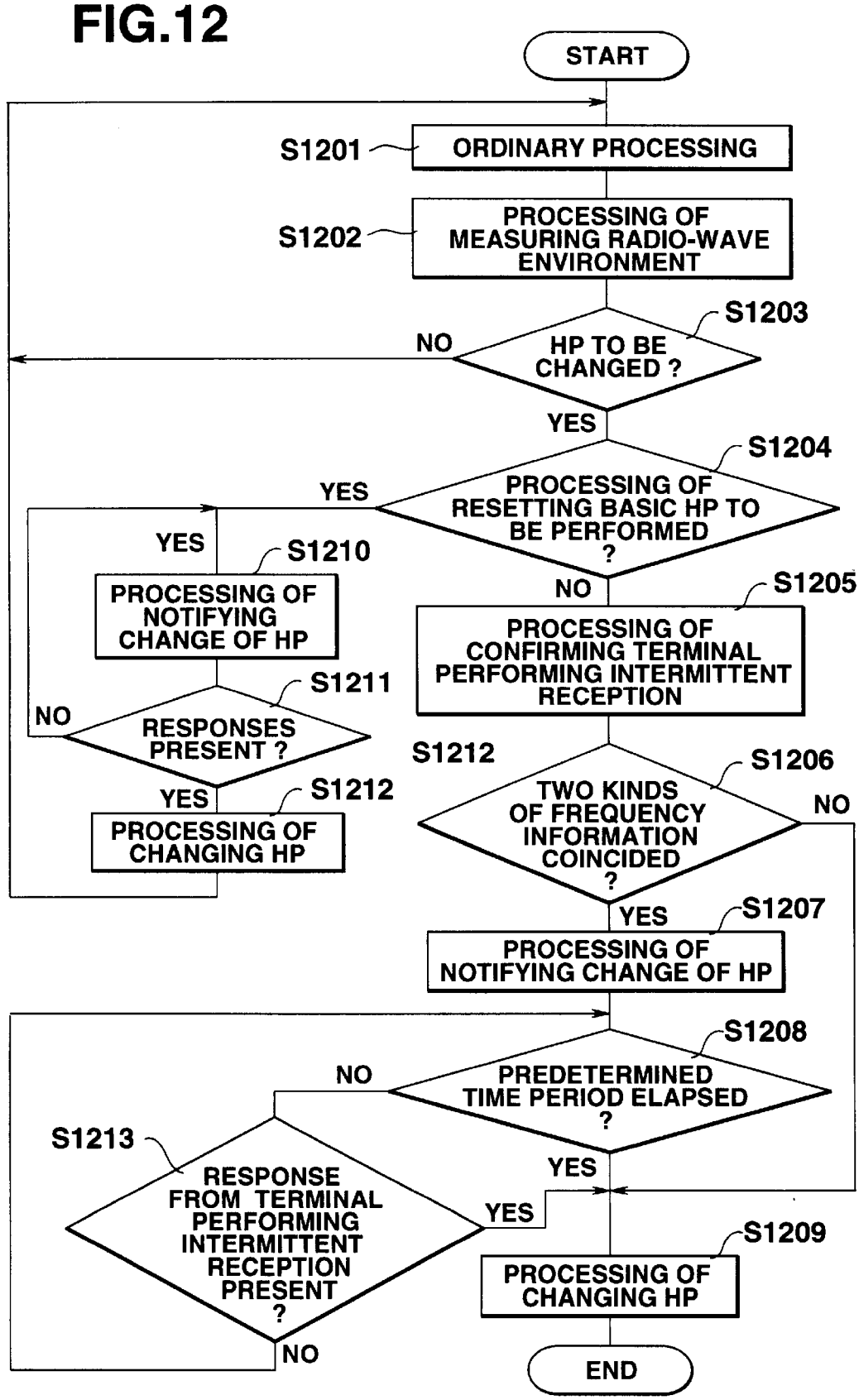
FIG. 12 is a flowchart illustrating the operation when radio-wave environment is degraded in the central control station used in the embodiment.

2. Processing when changing the hopping pattern (1) Processing when changing the hopping pattern in the central control station FIG. 12 is a flowchart illustrating the operation of the central control station.

While a CNT frame is output based on the basic hopping pattern as normal processing in step S1201, it is monitored in step S1202 if a frequency having degraded environment is present within the basic hopping pattern. In step S1203, it is determined if a frequency to be changed is present in the hopping pattern as the result of the monitoring. If the result of the determination is negative, the process returns to step S1201, where the normal processing is again performed. If the result of the determination in step S1203 is affirmative, the process proceeds to step S1204, where it is determined if the entire hopping pattern must be reconstructed. If the result of the determination in step S1204 is affirmative, the process proceeds to step S1210, where a change of all frequencies constituting the hopping pattern is notified to all terminal stations using the CNT frame. Then, in step S1211, it is determined if responses to the notification from all of the terminal stations are present. If the result of the determination in step S1211 is negative, the process returns to step S1210, where the notification of a change in the hopping pattern is retransmitted. If the result of the determination in step S1211 is affirmative, the process proceeds to step S1212, where the hopping pattern used in the system is changed.

If some of the frequencies, instead of all of the frequencies, constituting the hopping pattern are to be changed as the result of the determination in step S1204, the process proceeds to step S1205, where frequency information used in a terminal performing intermittent reception is compared with frequency information to be changed. In step S1206, it is determined if the frequency information to be changed coincides with the frequency information used for intermittent reception by the terminal station. If the result of the determination in step S1206 is affirmative, the process proceeds to step S1207, where the intermittent reception at the terminal station is terminated by outputting a control signal indicating the change of the hopping pattern to the concerned terminal station. If the result of the determination in step S1206 is negative, the process proceeds to step S1209, where the basic hopping pattern is changed without notifying terminal stations of the change. Upon completion of the notification to the terminal station in step S1207, it is then determined if a predetermined time period has elapsed in step. If the result of the determination in step S1208 is negative, the process proceeds to step S1213, where it is determined if a response indicating the end of the intermittent reception from the the terminal performing the intermittent reception is present. If the result of the determination in step S1213 is negative, the process returns to step S1208, where the predetermined time period is measured. If the result of the determination in step S1213 is affirmative, the process proceeds to step S1209, where processing of changing the hopping pattern is performed. If the result of the determination in step S1208 is affirmative, the process proceeds to step S1209, where the hopping pattern is changed even if a response indicating the end of the intermittent reception from the terminal performing the intermittent reception is not received, and a signal obtained by including information relating to the changed frequency in the NF portion of the synchronizing frame is output.

(2) Processing during a waiting state at a terminal station (during intermittent reception)

Figure 13:
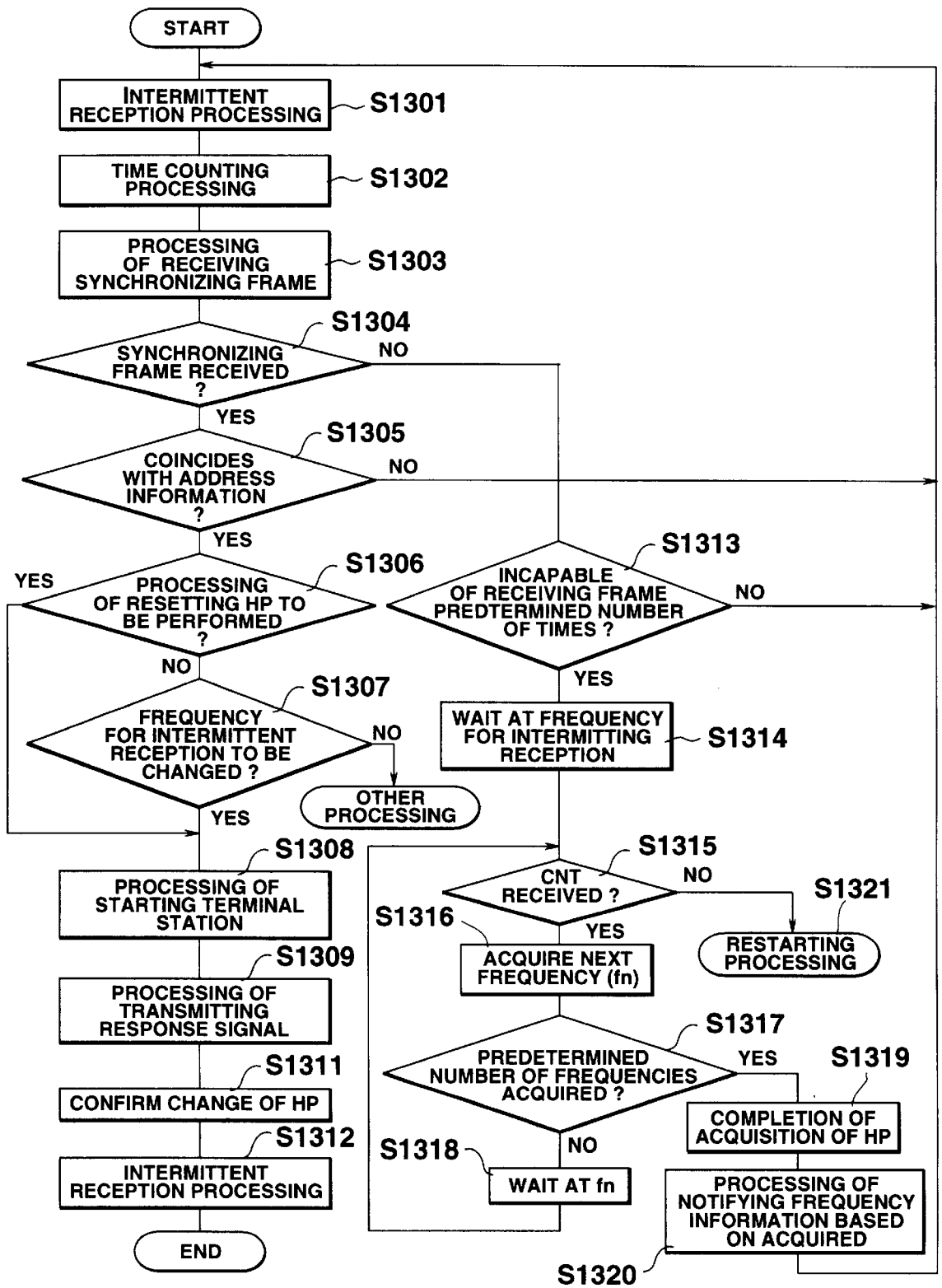
FIG. 13 is a flowchart illustrating the operation during intermittent reception at the terminal station used in the embodiment.

FIG. 13 is a flowchart illustrating the operation at a terminal station.

Upon completion of processing of turning on the power supply in step S1301, the terminal station determines the interval of intermittent reception according to the type of the terminal or setting through a switch or the like, and starts intermittent reception processing.

The main control unit 201 or 304 of the radio telephone set or the radio adapter, respectively, calculates the frequency for the intermittent reception from the hopping pattern acquired when the power supply has been turned on and the determined interval of the intermittent reception, and the intermittent reception is performed using the calculated frequency.

When the interval of the intermittent reception is shorter than one period of the hopping pattern and if one period of the hopping pattern is aliquot by the interval of the intermittent reception, the same frequency is used for the intermittent reception during one period of the hopping pattern irrespective of the number of cycles of the hopping pattern. Hence, it is only necessary to store the calculated frequency until the hopping pattern is changed. As a result, the design of the radio telephone set or the radio adapter is simplified, and the intermittent reception can be efficiently performed.

When the interval of the intermittent reception is longer than one period of the hopping pattern, if an integer multiple of one period of the hopping pattern equals the interval of the intermittent reception, the same frequency is always used for the intermittent reception. Hence, the design of the radio telephone set or the radio adapter is simplified, and the intermittent reception can be efficiently performed.

While the terminal station performs the intermittent reception using the CNT frame in step S1301, in step S1302, a predetermined time period is counted in accordance with the terminal type information recognized at the start.

If the terminal station is a telephone terminal, since calling/reception is frequently performed, the interval of processing of transmitting kind information is set shorter than in a data terminal. If the terminal station is a terminal having an AC power supply, such as a network control device or the like, the interval of transmission is set shorter than in the telephone terminal. In a data terminal, also, it is arranged so that the interval of transmission of kind information can be set depending on the frequency of the use and whether or not the terminal is to be moved. A predetermined interval may be set in advance as a default value for each kind of terminal, or the interval of intermittent reception may be manually set by an input through a DIP switch key at an initial stage.

When the predetermined time period has elapsed in the above-described processing, then, in step S1303, processing for receiving a CNT frame from the central control station at the frequency for the intermittent reception is performed. Then, the process proceeds to step S1304, where it is determined if synchronism has been obtained by receiving the CNT frame. If the result of the determination is negative, the process proceeds to step S1313, where processing of receiving the CNT frame at the frequency for the intermittent reception is performed a predetermined number of times. When synchronism has been again obtained by receiving the CNT frame in step S1313, the process returns to step S1301 and the intermittent reception is continued. If the CNT frame cannot be obtained in step S1313, the terminal station performs waiting for a predetermined time period at the frequency for the intermittent reception in order to obtain synchronism by receiving the CNT frame at the frequency for the intermittent reception (step S1314).

When the CNT frame could be received at the frequency for the intermittent reception as a result of the waiting operation (step S1315), the frequency to which the current frequency is to hop in the next unit time is aquired from the NF portion within the CNT frame (step S1316). If the number of acquired frequencies does not reach a predetermined number (the number of frequencies of the hopping pattern) in step S1317, the frequency shifts to the acquired frequency and waiting is performed (step S1318), and the reception of the CNT frame is again performed in step S1315.

When the number of acquired frequencies has reached the predetermined number in step S1317, it is then determined in step S1319 that the acquisition of the hopping pattern has been completed. Then, in step S1320, information relating to the frequency for intermittent reception by the terminal station obtained based on the acquired hopping pattern is notified to the central control station, and the process returns to step S1301, where the terminal station performs intermittent reception processing.

If the CNT frame could not be received at the frequency for the intermittent reception in step S1315, the process proceeds to step S1321, where the starting processing shown in FIGS. 11 and 12 is again performed.

If the result of the determination in step S1304 is affirmative, the process proceeds to step S1305, where data in the received address information portion is read and it is determined if the read address coincides with the address of the terminal. If the result of the determination is negative, the process returns to step S1301, where the intermittent reception processing is continued. If the result of the determination in step S1305 is affirmative, the process proceeds to step S1306, where the data of the control channel is received and the control data is analyzed, and it is determined if a request for resetting the hopping pattern has been received from the central control station. If the result of the determination in step S1306 is affirmative, the process proceeds to step S1308.

If the result of the determination in step S1306 is negative, the process proceeds to step S1307, where it is determined if a notification to change the frequency used for the intermittent reception by the terminal station is transmitted from the central control station. If the result of the determination in step S1307 is negative, other processing is performed. If the result of the determination in step S1307 is affirmative, the process proceeds to step S1308.

In step S1308, the processing of acquiring the hopping pattern shown in FIG. 11 is performed, i.e., the intermittent reception is terminated. Then, in step S1309, a response signal indicating a shift to the processing of acquiring the hopping pattern is transmitted.

After transmitting the response signal in step S1309, it is then assumed in step S1311 that the hopping pattern has been changed if the same hopping pattern has been received a plurality of times. Then, in step S1312, intermittent reception is performed.

(3) The operation sequence of the system

Figure 14:
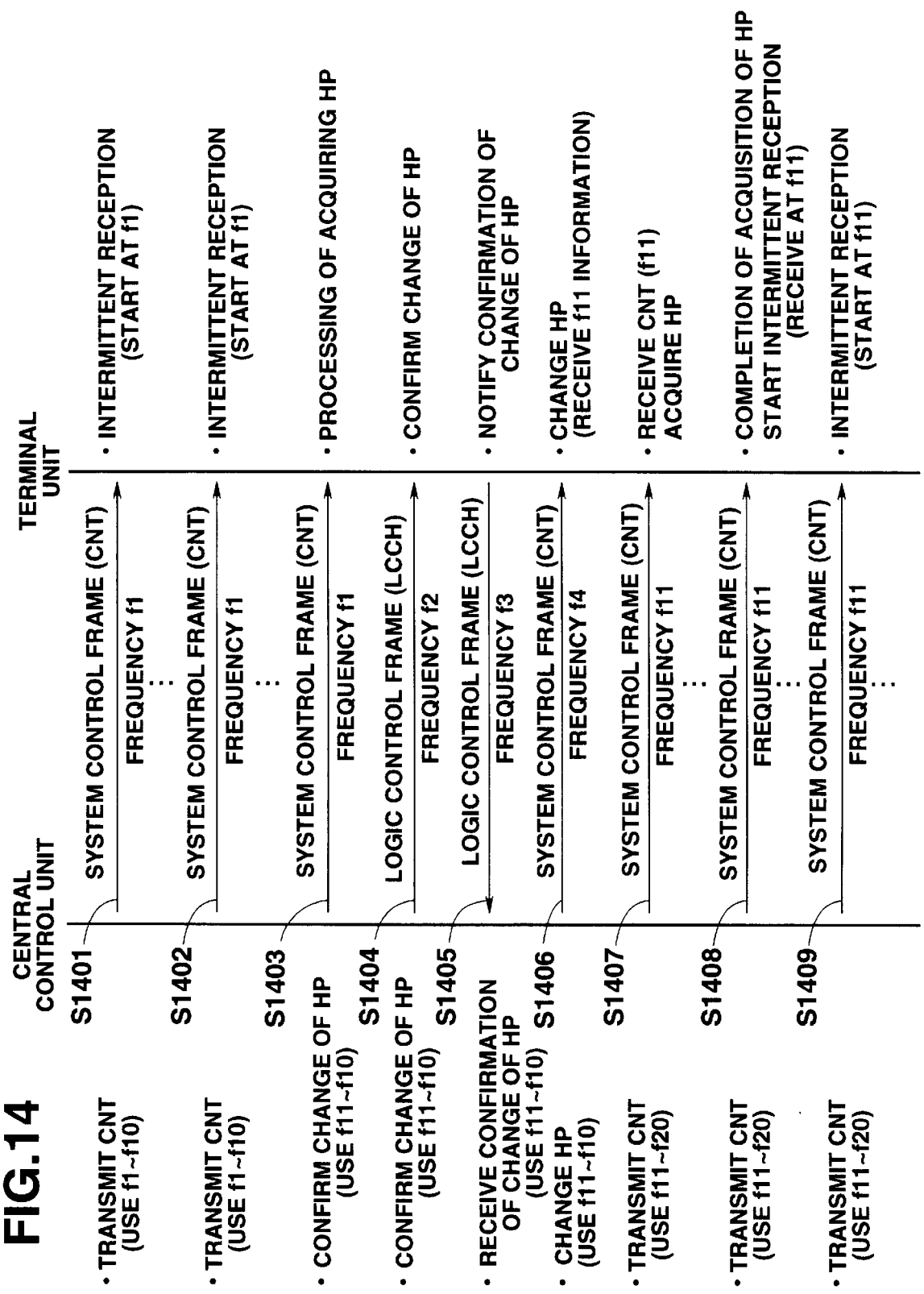
FIG. 14 is a diagram illustrating the operation sequence when changing the hopping pattern in the embodiment.
Figure 15:
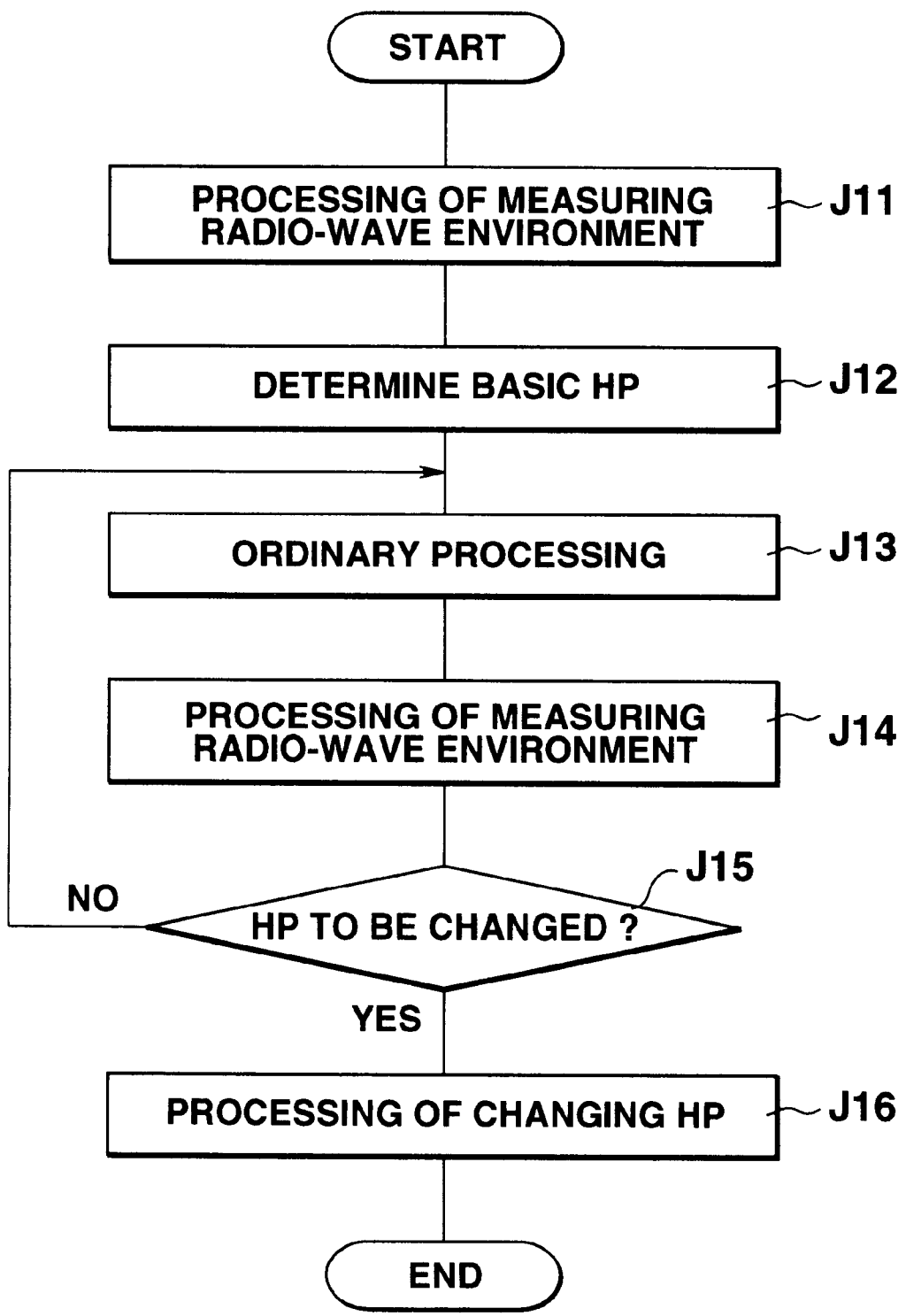
Figure 16:
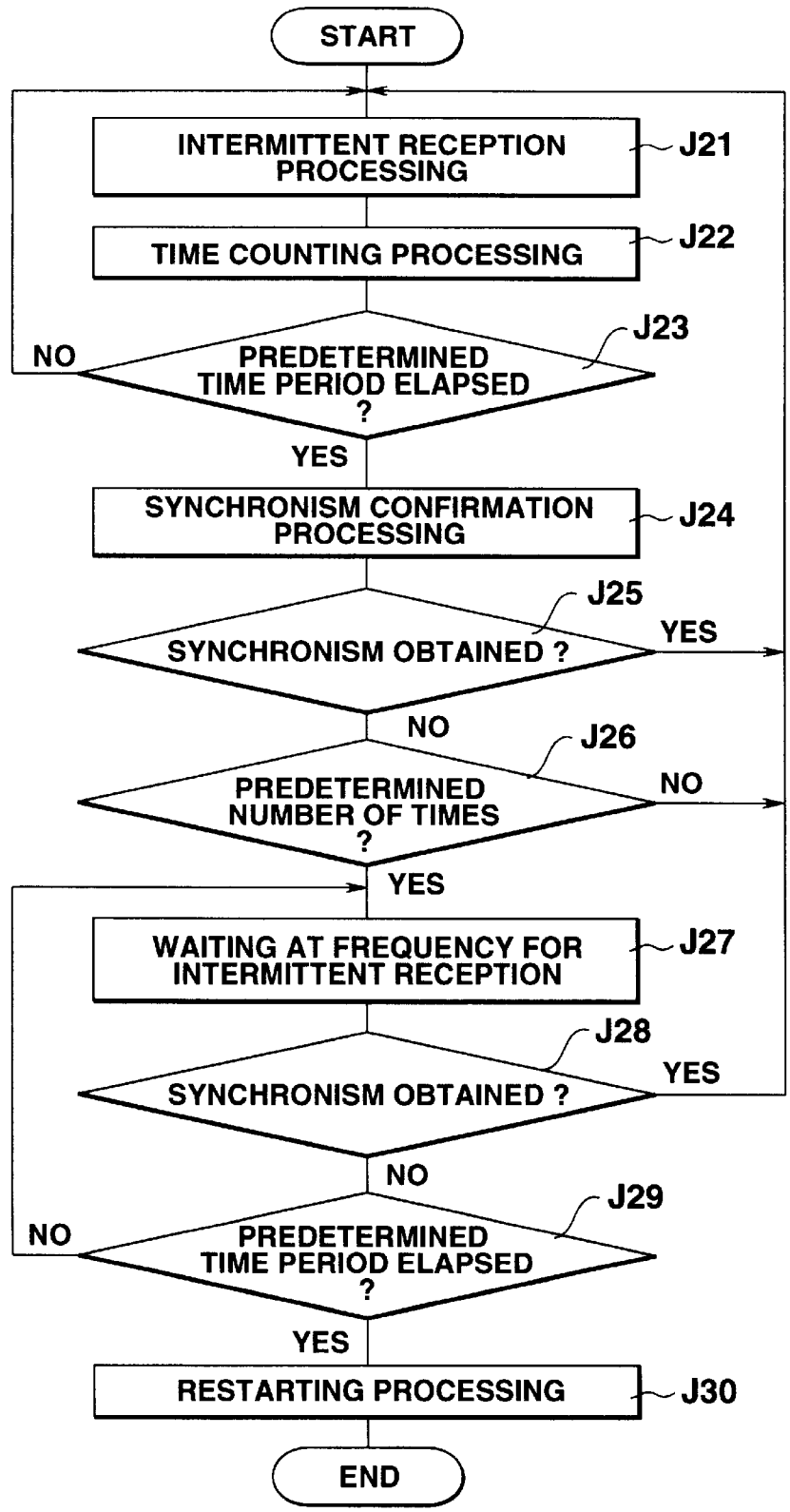
FIG. 16 is a flowchart illustrating the operation during intermittent reception in a conventional terminal station.

FIG. 14 illustrates the sequence when changing the hopping pattern in the system.

While the central control station transmits a CNT frame to a terminal station using the hopping frequencies f1–f10 in steps S1401 and S1402, the terminal station performs intermittent reception at the frequency f1 based on the CNT frame. In FIG. 14, a broken line indicates that the CNT frame is transmitted at each of the hopping frequencies. When the hopping pattern is to be changed at the central control station in step S1403, the central control station notifies the terminal station which performs the intermittent reception at the frequency f1 to terminate the intermittent reception and to switch the frequency in accordance with the hopping pattern. In step S1404, the central control station notifies the terminal station through the logic control channel using the frequency f2 to change the hopping pattern. In step S1405, the terminal station transmits the confirmation of the change of the hopping pattern to the central control station using the frequency f3. When the central control station has confirmed that signal, then, in step S1406, the central control station transmits a signal obtained by including information relating to the frequency (F11) to which the current frequency is to be changed in the CNT frame to the terminal station. Upon the reception of the frequency information (f11), the terminal station switches the frequency based on the received information and acquires the hopping pattern. In the present embodiment, the frequencies f11–f20 are acquired. When the terminal station has acquired, in step S1408, the frequency information (f11–f20) based on the CNT frame from the central control station, it starts intermittent reception at an arbitrary frequency from among the acquired frequencies. In the present embodiment, the terminal station shifts to intermittent reception processing at the frequency f11. Then, in step S1409, intermittent reception of receiving the CNT frame from the central control station at the frequency f11 at every predetermined time interval is performed.

As described above, according to the present invention, when the central control station changes a frequency used in the basic hopping pattern, it notifies the terminal station whether the basic hopping pattern itself is to be changed or an arbitrary frequency in the hopping pattern is to be changed. Thus, the terminal station performing intermittent reception need not perform a useless restarting operation and the rate of occurrence of an inoperable state of the terminal state is reduced, so that the operability of the terminal station is improved.

Furthermore, since a state in which all terminal stations in the system which perform intermittent reception simultaneously become inoperable is not provided, reliability in the entire system is improved.

Since the terminal station need not frequently perform restarting processing, electric power consumption can be reduced, and therefore an economical radio information communication system can be provided.

By performing intermittent reception by obtaining an appropriate frequency from the relationship between the interval of the intermittent reception and the hopping pattern, the design of intermittent reception can be simplified, and intermittent reception can be efficiently performed.

The individual components shown in outline or designated by blocks in the drawings are all well known in the radio communication system arts and their specific construction and operation are not critical to the operation or the best mode for carrying out the invention.

While the present invention has been described with respect to what is presently considered to be the preferred embodiment, it is to be understood that the invention is not limited to the disclosed embodiment. To the contrary, the present invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A radio communication system comprising at least one radio communication apparatus, and a radio control apparatus, connected to the radio communication apparatus via radio waves, for performing communication using a frequency hopping method, said radio control apparatus comprising:

frequency determination means for determining frequencies to be used in frequency hopping communication;

hopping-pattern configuring means for configuring a hopping pattern based on the frequencies determined by said frequency determination means;

notification means for notifying said radio communication apparatus of the hopping pattern configured by said hopping-pattern configuring means;

instruction means for instructing an end of intermittent reception to said radio communication apparatus; and first control means for performing control such that, when said frequency determination means has redetermined frequencies while said radio communication apparatus performs the intermittent reception, said instruction means instructs the end of the intermittent reception, said hopping-pattern configuring means reconfigures the hopping pattern, and said notification means notifies the reconfigured hopping pattern;

said radio communication apparatus comprising:

intermittent reception means for performing intermittent reception based on the hopping pattern notified from said notification means; and second control means for performing control such that, when the instruction of the end of the intermittent reception from said instruction means has been received, the intermittent reception is ended, and said radio communication apparatus shifts to a state of receiving the notification of the hopping pattern from said notification means.

2. A system according to claim 1, wherein said radio control apparatus further comprises transmission means for transmitting information for obtaining synchronism between said radio communication apparatus and said radio control apparatus, wherein said intermittent reception means receives the information for synchronism at predetermined time intervals.

3. A system according to claim 1, wherein said intermittent reception means determines a frequency for performing the intermittent reception based on a relationship between one period of the hopping pattern notified from said notification means and a time interval of the intermittent reception.

4. A system according to claim 3, wherein the relationship between the one period of the hopping pattern notified from said notification means and the time interval of the intermittent reception is such that the one period of the hopping pattern is aliquot by the time interval of the intermittent reception.

5. A system according to claim 3, wherein the relationship between the one period of the hopping pattern notified from said notification means and the time interval of the intermittent reception is such that the time interval of the intermittent reception is an integer multiple equal to or greater than 2 of the one period of the hopping pattern.

6. A system according to claim 1, wherein said instruction means transmits information indicating a change in the hopping pattern.

7. A system according to claim 1, wherein said instruction means instructs the end of the intermittent reception to all radio communication apparatuses performing the intermittent reception.

8. A system according to claim 1, wherein said instruction means instructs the end of the intermittent reception to radio terminals performing the intermittent reception at frequencies to be changed.

9. A radio control apparatus, accommodating at least one radio communication apparatus, for performing communication using a frequency hopping method, said radio control apparatus comprising:

frequency determination means for determining frequencies to be used in frequency hopping communication;

hopping-pattern configuring means for configuring a hopping pattern based on the frequencies determined by said frequency determination means;

notification means for notifying the radio communication apparatus of the hopping pattern configured by said hopping-pattern configuring means;

instruction means for instructing an end of intermittent reception to the radio communication apparatus; and control means for performing control such that, when said frequency determination means has redetermined frequencies while the radio communication apparatus performs the intermittent reception, said instruction means instructs the end of the intermittent reception, said hopping-pattern configuring means reconfigures the hopping pattern, and said notification means notifies the reconfigured hopping pattern.

10. A radio control apparatus according to claim 9, further comprising transmission means for transmitting information for obtaining synchronism between the radio communication apparatus and said radio control apparatus.

11. A radio control apparatus according to claim 9, wherein said instruction means transmits information indicating a change in the hopping pattern.

12. A radio control apparatus according to claim 9, wherein said instruction means instructs the end of the intermittent reception to all radio communication apparatuses performing the intermittent reception.

13. A radio control apparatus according to claim 9, wherein said instruction means instructs the end of the intermittent reception to radio terminals performing the intermittent reception at frequencies to be changed.

14. A radio communication apparatus, accommodated by a radio control apparatus, for performing communication using a frequency hopping method, said radio communication apparatus comprising:
  intermittent reception means for intermittently receiving control information transmitted from the radio control apparatus based on a hopping pattern;
  intermittent-reception ending means for ending the intermittent reception when said intermittent reception means has received an instruction of an end of the intermittent reception transmitted from the radio control apparatus; and
  shift means for shifting to a state of receiving a notification of the hopping pattern from the radio control apparatus when said intermittent-reception ending means has ended the intermittent reception.

15. A radio communication apparatus according to claim 14, wherein said intermittent reception means receives the information for synchronism transmitted from the radio control apparatus at each of predetermined time intervals.

16. A radio communication apparatus according to claim 14, wherein said intermittent reception means determines a frequency for performing the intermittent reception based on a relationship between one period of the hopping pattern and a time interval of the intermittent reception.

17. A radio communication apparatus according to claim 16, wherein the relationship between the one period of the hopping pattern and the time interval of the intermittent reception is such that the one period of the hopping pattern is aliquot by the time interval of the intermittent reception.

18. A radio communication apparatus according to claim 16, wherein the relationship between the one period of the hopping pattern and the time interval of the intermittent reception is such that the time interval of the intermittent reception is an integer multiple equal to or greater than 2 of the one period of the hopping pattern.

19. A radio communication apparatus, accommodated by a radio control apparatus, for performing communication using a frequency hopping method, said radio communication apparatus comprising:
  storage means for storing a hopping pattern;
  time counting means for counting a time period obtained by dividing or multiplying one period of the hopping pattern stored in said storage means by an integer equal to or greater than 2; and
  intermittent reception means for performing intermittent reception at a frequency within the hopping pattern corresponding to the counted time period when the counting has been performed by said time counting means.

20. A method for controlling a radio communication system including at least one radio communication apparatus, and a radio control apparatus, connected to the radio communication apparatus via radio waves, for performing communication using a frequency hopping method, said control method comprising, in the radio control apparatus, the steps of:
  determining frequencies to be used in frequency hopping communication;
  configuring a hopping pattern based on the frequencies determined in said frequency determining step;
  notifying the radio communication apparatus of the hopping pattern configured in said hopping-pattern configuring step;
  instructing an end of intermittent reception to the radio communication apparatus; and
  performing control such that, when the frequency determining step has redetermined frequencies while the radio communication apparatus performs the intermittent reception, said instructing step instructs the end of the intermittent reception, said hopping-pattern configuring step reconfigures the hopping pattern, and the notifying step notifies the reconfigured hopping pattern, and comprising, in the radio communication apparatus, the steps of:
  performing the intermittent reception based on the hopping pattern notified from the radio communication apparatus; and
  performing control such that, when the end of the intermittent reception has been instructed from the radio control apparatus while the intermittent reception step perfoms the intermittent reception, the radio communication apparatus shifts to a state of receiving the notification of the hopping pattern from the radio control apparatus by ending the intermittent reception.

21. A control method according to claim 20, further comprising, in the radio control apparatus, the step of transmitting to the radio communication apparatus information for obtaining synchronism between the radio communication apparatus and the radio control apparatus, wherein the radio communication apparatus receives, in said intermittent reception step, the information for synchronism at predetermined time intervals.

22. A control method according to claim 20, wherein said intermittent reception step performs the intermittent reception at a frequency based on a relationship between one period of the hopping pattern and a time interval of the intermittent reception.

23. A control method according to claim 22, wherein the relationship between the one period of the hopping pattern and the time interval of the intermittent reception is such that the one period of the hopping pattern is aliquot by the time interval of the intermittent reception.

24. A control method according to claim 22, wherein the relationship between the one period of the hopping pattern and the time interval of the intermittent reception is such that the time interval of the intermittent reception is an integer multiple equal to or greater than 2 of the one period of the hopping pattern.

25. A control method according to claim 20, wherein said instructing step instructs intermittent reception by notifying a change in the hopping pattern.

26. A control method according to claim 20, wherein said instructing step instructs the end of the intermittent reception to all radio communication apparatuses performing the intermittent reception within the system.

27. A control method according to claim 20, wherein said instructing step instructs the end of the intermittent reception to radio terminals performing the intermittent reception at frequencies to be changed.

28. A method for controlling a radio control apparatus, accommodating at least one radio communication apparatus, for performing communication using a frequency hopping method, said control method comprising the steps of:

determining frequencies to be used in frequency hopping communication;

configuring a hopping pattern based on the frequencies determined in said frequency determinating step;

notifying the radio communication apparatus of the hopping pattern configured in said hopping-pattern configuring step;

instructing an end of intermittent reception for the radio communication apparatus; and performing control such that, when the frequency determinating step has redetermined frequencies while the radio communication apparatus performs the intermittent reception, the instruction step instructs the end of the intermittent reception, the hopping-pattern configuring step reconfigures the hopping pattern, and the notifying step notifies the reconfigured hopping pattern.

29. A control method according to claim 28, further comprising, in the radio control apparatus, the step of transmitting to the radio communication apparatus information for obtaining synchronism between the radio communication apparatus and the radio control apparatus.

30. A control method according to claim 28, wherin said instructing step instructs the end of the intermittent reception using information indicating a change in the hopping pattern.

31. A control method according to claim 28, wherein said instructing step instructs the end of the intermittent reception to all radio communication apparatuses performing the intermittent reception within the system.

32. A control method according to claim 28, wherein said instructing step instructs the end of the intermittent reception to radio terminals performing the intermittent reception at frequencies to be changed.

33. A method for controlling a radio communication apparatus, accommodated within a radio control apparatus, to perform communication using a frequency hopping method, said control method comprising intermittent reception step of intermittently receiving control information transmitted from the radio communication apparatus based on a hopping pattern; and intermittent-reception ending step of ending the intermittent reception when in said intermittent reception step, an instruction of an end of the intermittent reception transmitted from the radio control apparatus has received; and shift step of shifting to a state of receiving a notification of the hopping pattern from the radio control apparatus when in said intermittent-reception ending step, the intermittent reception has been ended.

34. A control method according to claim 33, wherein said intermittent reception step receives information for obtaining synchronism transmitted from the radio control apparatus at predetermined time intervals.

35. A control method according to claim 33, wherein said intermittent reception step determines a frequency for performing the intermittent reception based on a relationship between one period of the hopping pattern and a time interval of the intermittent reception.

36. A control method according to claim 35, wherein the relationship between the one period of the hopping pattern and the time interval of the intermittent reception is such that the one period of the hopping pattern is aliquot by the time interval of the intermittent reception.

37. A control method according to claim 35, wherein the relationship between the one period of the hopping pattern and the time interval of the intermittent reception is such that the time interval of the intermittent reception is an integer multiple equal to or greater than 2 of the one period of the hopping pattern.

38. A method for controlling a radio communication apparatus, accommodated by a radio control apparatus, for performing communication using a frequency hopping method, said control method comprising the steps of:

storing a hopping pattern;

counting a time period obtained by dividing or multiplying one period of the hopping pattern stored in the storing step by an integer equal to or greater than 2; and performing intermittent reception at a frequency within the hopping pattern corresponding to the time period counted in the time counting step.

39. A radio communication apparatus for performing communication using a frequency hopping method, said radio communication apparatus comprising:

intermittent reception ending means for ending intermittent reception, when a first hopping pattern is changed to a second hopping pattern while the other of said radio communication apparatus for performing communication based on the first hopping pattern performs the intermittent reception; and notification means for notifying the other of said radio communication apparatus of the second hopping pattern in accordance with an end of the intermittent reception by said intermittent reception ending means.

40. A radio communication apparatus for performing communication using a frequency hopping method based on an first hopping pattern, said radio communication apparatus comprising:

intermittent reception means for intermittently receiving control information transmitted from the other of said radio communication apparatus; and control means for performing control such that, in accordance with an instruction by the other of said radio communication apparatus when the first hopping pattern is changed a second hopping pattern, said radio communication apparatus shifts from a state of the intermittent reception by said intermittent reception means to that of receiving a notification of the second hopping pattern.

41. A method for controlling a radio communication apparatus for performing communication using a frequency hopping method, said control method comprising the steps of:

ending intermittent reception, when a first hopping pattern is changed to a second hopping pattern while the other of said radio communication apparatus for performing communication based on the first hopping pattern performs the intermittent reception; and notifying the other of said radio communication apparatus of the second hopping pattern in accordance with an end of the intermittent reception in said intermittent reception ending step.

42. A method for controlling a radio communication apparatus for performing communication using a frequency hopping method based on a first hopping pattern, said controlling method comprising the steps of:

intermittently receiving control information transmitted from the other of said radio communication apparatus; and performing control such that, in accordance with an instruction from the other of said radio communication apparatus when the first hopping pattern is changed to a second hopping pattern, a state of the intermittent reception in said intermittent reception step is shifted to that of receiving the second hopping pattern.

* * * * *

UNITED STATES PATENT AND TRADEMARK OFFICE
CERTIFICATE OF CORRECTION

PATENT NO.   : 6,144,693
DATED        : November 7, 2000
INVENTOR(S)  : Hideya Tabeta Page 1 of 1

It is certified that error appears in the above-identified patent and that said Letters Patent is hereby corrected as shown below:

Sheet No. 8,
Figure 8, "DETER MINE" should read -- DETERMINE --.

Column 2,
Line 37, "J22," should read -- J21, --.

Column 4,
Line 38, "effIciently" should read -- efficiently --.

Column 7,
Line 56, "stat in;" should read -- station; --.

Column 10,
Line 41, "like. The operation" should read -- like. ¶ The operation --.
Line 59, "signal+a" should read -- signal + a --.

Column 18,
Line 33, "the" ($2^{nd}$ occurrence) should be deleted.

Column 25,
Line 44, "comprising" should read -- comprising: --.

Column 26,
Line 35, "an" should read -- a --.

Signed and Sealed this

Thirteenth Day of November, 2001

*Attest:*

NICHOLAS P. GODICI
*Attesting Officer*   *Acting Director of the United States Patent and Trademark Office*